| (12) | United States Patent | (10) Patent No.: | US 9,223,508 B2 |
|---|---|---|---|
| | Motonaga et al. | (45) Date of Patent: | Dec. 29, 2015 |

(54) STORAGE SYSTEM

(71) Applicant: HITACHI, LTD., Tokyo (JP)

(72) Inventors: Mamoru Motonaga, Kaisei (JP); Takashi Chikusa, Odawara (JP); Takashi Nozawa, Odawara (JP); Yuko Matsui, Odawara (JP); Megumi Hokazono, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/624,638

(22) Filed: Feb. 18, 2015

(65) Prior Publication Data

US 2015/0160875 A1 Jun. 11, 2015

Related U.S. Application Data

(63) Continuation of application No. 13/731,808, filed on Dec. 31, 2012, now Pat. No. 8,966,174, which is a continuation of application No. 12/314,982, filed on Dec. 19, 2008, now Pat. No. 8,370,570.

(30) Foreign Application Priority Data

Oct. 8, 2008 (JP) .................................. 2008-261997

(51) Int. Cl.
*G06F 3/06* (2006.01)
*G06F 11/20* (2006.01)
*G06F 12/08* (2006.01)

(52) U.S. Cl.
CPC ............ *G06F 3/0619* (2013.01); *G06F 3/0613* (2013.01); *G06F 3/0617* (2013.01); *G06F 3/0622* (2013.01); *G06F 3/0634* (2013.01); *G06F 3/0635* (2013.01);

(Continued)

(58) Field of Classification Search
CPC ............ G06F 13/4027; G06F 13/1694; G06F 2212/262; G06F 3/0634; G06F 3/0665; G06F 3/0689; G06F 11/1048; G06F 13/1668; G06F 3/0613; G06F 3/0635; G06F 3/0658; G06F 3/0619; G06F 3/0685; G06F 11/201; G06F 11/2089; G06F 11/2094; G06F 12/0804; G06F 12/0866; G06F 3/0617; G06F 3/0622; G06F 3/0637; G06F 3/0662
See application file for complete search history.

(56) References Cited

U.S. PATENT DOCUMENTS 6,219,753 B1 4/2001 Richardson
6,578,158 B1 * 6/2003 Deitz et al. ..................... 714/11

(Continued)

FOREIGN PATENT DOCUMENTS

JP 2-226548 9/1990
JP 2004-005370 1/2004

(Continued)

*Primary Examiner* — Hashem Farrokh
(74) *Attorney, Agent, or Firm* — Mattingly & Malur, PC

(57) ABSTRACT

Disclosed is a storage system that suppress occurrence of a bottleneck in the storage system, efficiently uses a bandwidth of hardware, and achieves high reliability. A storage system includes a storage apparatus that stores data, a controller that controls data input/output with respect to the storage apparatus, and an interface that couples the storage apparatus and the controller. The storage apparatus has a plurality of physical ports that are couples to the interface. The controller logically partitions a storage area of the storage apparatus into a plurality of storage areas and provides the plurality of storage areas, or allocates the plurality of physical ports to the logically partitioned storage areas.

7 Claims, 23 Drawing Sheets

(52) U.S. Cl.
CPC .......... *G06F 3/0637* (2013.01); *G06F 3/0658* (2013.01); *G06F 3/0665* (2013.01); *G06F 3/0685* (2013.01); *G06F 3/0689* (2013.01); *G06F 11/201* (2013.01); *G06F 11/2089* (2013.01); *G06F 11/2094* (2013.01); *G06F 12/0804* (2013.01); *G06F 12/0866* (2013.01); *Y02B 60/1225* (2013.01)

(56) References Cited

U.S. PATENT DOCUMENTS

| | | | |
|---|---|---|---|
| 7,032,041 B2 | 4/2006 | Sahara et al. | |
| 7,209,986 B2 | 4/2007 | Ohno et al. | |
| 7,213,115 B2 | 5/2007 | Sato et al | |
| 7,269,674 B2 | 9/2007 | Chikusa et al. | |
| 7,571,289 B2 | 8/2009 | Gotoh et al. | |
| 7,613,877 B2 | 11/2009 | Shimozono et al. | |
| 7,685,628 B2 | 3/2010 | Fukui et al. | |
| 7,861,052 B2 | 12/2010 | Kawamura et al. | |
| 7,913,037 B2 | 3/2011 | Nakajima et al. | |
| 8,001,349 B2 | 8/2011 | Ozaki et al. | |
| 8,301,810 B2 * | 10/2012 | Pang et al. | 710/74 |
| 2006/0112247 A1 * | 5/2006 | Ramany et al. | 711/165 |
| 2006/0215552 A1 * | 9/2006 | Iwata et al. | 370/229 |
| 2006/0236028 A1 | 10/2006 | Tanaka et al. | |
| 2007/0192539 A1 | 8/2007 | Kano et al. | |
| 2007/0220203 A1 | 9/2007 | Murase | |
| 2007/0220204 A1 | 9/2007 | Nakajima et al. | |
| 2007/0288535 A1 | 12/2007 | Shitomi et al. | |
| 2008/0086608 A1 | 4/2008 | Kano | |
| 2008/0104264 A1 * | 5/2008 | Duerk et al. | 709/230 |
| 2009/0077310 A1 | 3/2009 | Ashton et al. | |
| 2010/0030982 A1 | 2/2010 | Sela et al. | |

FOREIGN PATENT DOCUMENTS

| | | |
|---|---|---|
| JP | 2005-149173 A | 6/2005 |
| JP | 2005-149276 | 6/2005 |
| JP | 2005-165443 | 6/2005 |
| JP | 2005-301638 | 10/2005 |
| JP | 2006-072636 | 3/2006 |
| JP | 2006-127398 A | 5/2006 |
| JP | 2007-094681 | 4/2007 |
| JP | 2007-256993 | 10/2007 |
| JP | 2007-272875 A | 10/2007 |
| JP | 2007-280422 | 10/2007 |
| JP | 2007-310495 | 11/2007 |
| JP | 2007-334878 | 12/2007 |
| JP | 2008-097578 | 4/2008 |
| JP | 2008-108026 | 5/2008 |
| JP | 2008-112343 | 5/2008 |
| JP | 2008-171420 | 7/2008 |
| WO | WO 2007/018778 A1 | 2/2007 |

* cited by examiner

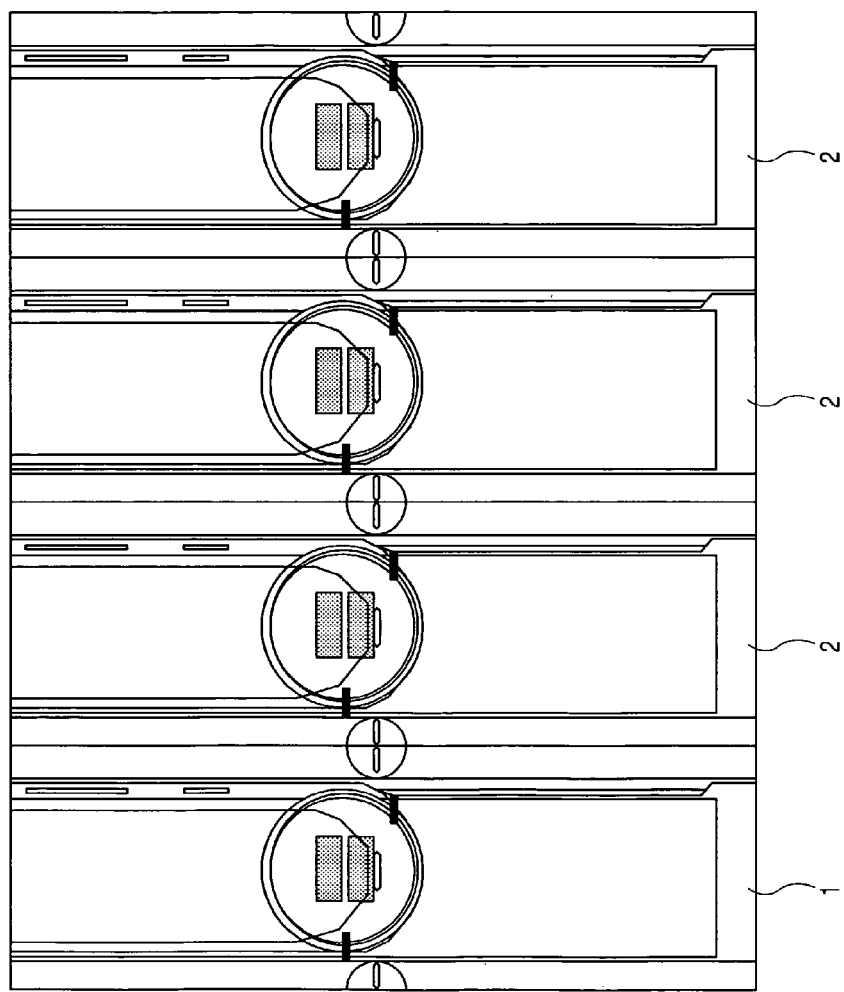

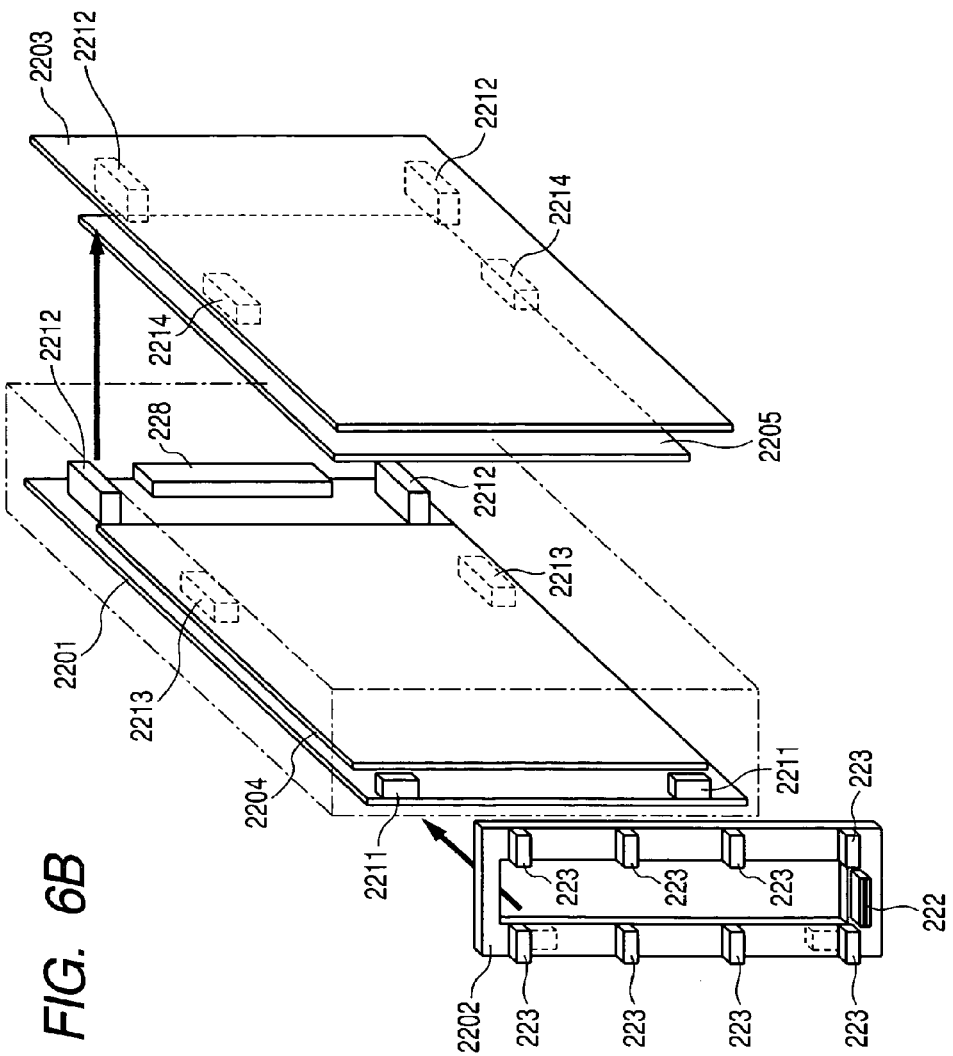

FIG. 9A
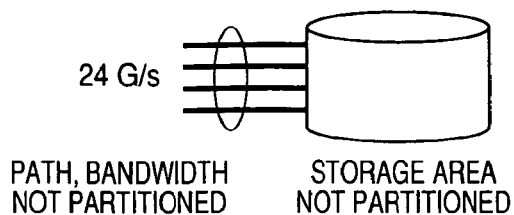
24 G/s
PATH, BANDWIDTH NOT PARTITIONED    STORAGE AREA NOT PARTITIONED FIG. 9B
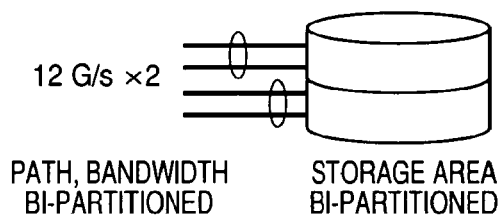
12 G/s ×2
PATH, BANDWIDTH BI-PARTITIONED    STORAGE AREA BI-PARTITIONED FIG. 9C
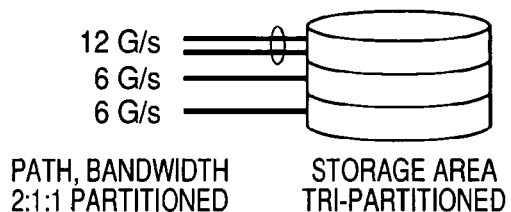
12 G/s
6 G/s
6 G/s
PATH, BANDWIDTH 2:1:1 PARTITIONED    STORAGE AREA TRI-PARTITIONED FIG. 9D
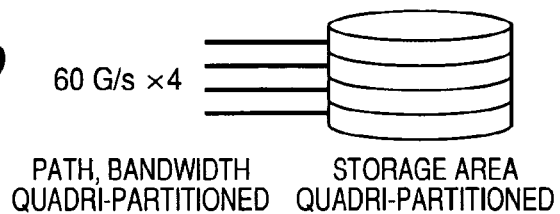
60 G/s ×4
PATH, BANDWIDTH QUADRI-PARTITIONED    STORAGE AREA QUADRI-PARTITIONED FIG. 9E
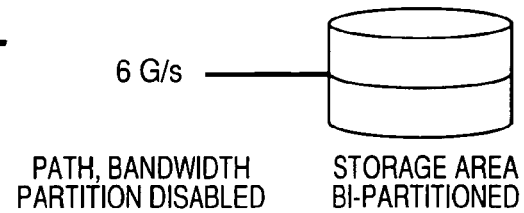
6 G/s
PATH, BANDWIDTH PARTITION DISABLED    STORAGE AREA BI-PARTITIONED FIG. 9F
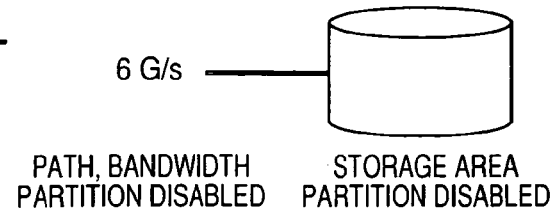
6 G/s
PATH, BANDWIDTH PARTITION DISABLED    STORAGE AREA PARTITION DISABLED

FIG. 10

| HOST Gr | LOGICAL PARTITION Gr | FE PORT (NUMBER OF PORTS) | SYSTEM THROUGHPUT | CACHE CAPACITY/ MODE | B/E Zoning | Vol Gr | DRIVE TYPE | SSD/HDD LPAR AREA (CAPACITY) | SSD/HDD LPAR PATH (BANDWIDTH) | ESTIMATED LOAD |
|---|---|---|---|---|---|---|---|---|---|---|
| PW_USER_1 | Tier_S0-0 | P0-P15 (16) | Best_Effort | 500 GB RND | Auto | A-0 | SSD | ALL | 4×(24 G/s) | HIGHEST |
| PW_USER_2 | Tier_S1-1 | P16-P19 (4) | High | 10 GB RND | Auto | B-0 | SSD | 200 GB/Drive | 2×(12 G/s) | HIGH |
| USER_A | Tier_S1-2 | P20-P23 (4) | Good | 5 GB SEQ | Auto | B-1 | SSD | 150 GB/Drive | 1×(6 G/s) | HIGH |
| USER_B | Tier_S1-3 | P24-P27 (4) | Good | 5 GB RND | none | B-2 | SSD | 150 GB/Drive | 1×(6 G/s) | HIGH-MEDIUM |
| USER_C | Tier_H1-0 | P28-P29 (2) | Good | 20 GB RND | Auto | C-0 | HDD (SAS) | 150 GB/Drive | 1×(6 G/s) | HIGH-MEDIUM |
| USER_D | Tier_H1-1 | P30-P31 (2) | Normal | 10 GB RND | none | C-1 | HDD (SAS) | 150 GB/Drive | 1×(6 G/s) | MEDIUM |
| BACKUP_1 | Tier_H2-0 | P30-P31 (2) | Low | 5 GB SEQ | none | D-0 | HDD (SATA) | ALL | 1×(6 G/s) | LOW |
| OTHER | BASIC | P28-P31 (4) | Normal | 20 GB RND | none | Pool-0 | HDD (Mixed) | ALL | 1×(6 G/s) | MEDIUM |

FIG. 13A

1200 MANAGEMENT TABLE

| LOGICAL PARTITION Gr | VIRTUAL MULTILINK | TARGET PORT | DISK GROUP |
|---|---|---|---|
| A | 2 | A0, A1 | 0, 1, 2, 3, ... |
| B | 2 | A1, A2 | 0, 1, 2, 3, ... |
| C | 2 | A2, A3 | 0, 1, 2, 3, ... |
| D | 2 | A3, A0 | 0, 1, 2, 3, ... |
| ⋮ | ⋮ | ⋮ | ⋮ |
| A' | 2 | B0, A1 | 7 |
| B' | 2 | A1, A2 | 7 |
| C' | 2 | A2, A3 | 7 |
| D' | 2 | A3, B0 | 7 |

Rows A–D: 1205
Rows A'–D': 1206

Columns: 1201, 1202, 1203, 1204

FIG. 13B

1210 MANAGEMENT TABLE

| PHYSICAL PORT No. (1211) | VIRTUAL ZONE Gr (1212) | VIRTUAL MULTILINK (1213) | PHYSICAL LINK (1214) |
|---|---|---|---|
| 0 (0-3) | A | 2 | 0-0, 0-1 |
|  | B | 2 | 0-1, 0-2 |
|  | C | 2 | 0-2, 0-3 |
|  | D | 2 | 0-3, 0-0 |
| 1 (4-7) | A | 2 | 1-0, 1-1 |
|  | B | 2 | 1-1, 1-2 |
|  | C | 2 | 1-2, 1-3 |
|  | D | 2 | 1-3, 1-0 |
| ⋮ | ⋮ | ⋮ | ⋮ |
| 7 (28-31) ※ 7-0 PORT FAIL DOWN | A | 2 | <u>10-x</u>, 7-1 |
|  | B | 2 | 7-1, 7-2 |
|  | C | 2 | 7-2, 7-3 |
|  | D | 2 | 7-3, <u>10-x</u> |
| ⋮ | ⋮ | ⋮ | ⋮ |

STORAGE SYSTEM

CROSS REFERENCES TO RELATED APPLICATIONS

This application is a continuation application of U.S. application Ser. No. 13/731,808, filed Dec. 31, 2012, which is a continuation application of U.S. application Ser. No. 12/314,982 filed Dec. 19, 2008, now U.S. Pat. No. 8,370,570, which claims the the priority of Japanese Patent Application No. 2008-261997, filed on Oct. 8, 2008, the entire disclosure of which is incorporated herein by reference.

BACKGROUND OF THE INVENTION

1. Field of the Invention

The present invention relates to a storage system, and in particular, a technology that speeds up a storage system and improves reliability.

2. Description of the Related Art

In a storage system (disk array device), an increase in capacity of a storage module such as a hard disk drive (HDD) or a Solid State Drive ("SSD" or "semiconductor memory storage device") leads to an increase in capacity of a group (a RAID group or a storage pool) having the storage module.

In many cases, an upper limit capacity of a logical volume (LU) on the group having the storage module is 2 TB. The reason for the upper limit capacity is that an LBA specified area as parameters of the READ (10) command and the WRITE (10) command in the SCSI protocol normally used in a block access-type storage apparatus is four bytes. As a command with an LBA area expanded, variable-length READ (16) command and WRITE (16) command are defined, but many storage systems do not yet support those commands.

A plurality of LUs may be in the same group. In this case, even if access is performed to logically different LUs, the access is actually performed to the physically same storage devices. The access to the same storage devices invites a bottleneck in view of performance.

A hard disk drive, which is popularly used as a storage device, has a response time cause of disk rotation or a head seek time in the unit of millisecond. For this reason, performance depending on a mechanical cause does not follow the improvement in performance of an interface or a controller. That is, the mechanical cause becomes a bottleneck of performance.

A Solid State Drive (SSD) does not have a mechanical response time, and thus data may be read and written at high speed. However, the SSD is designed focusing on compatibility with the hard disk drive, it is difficult to sufficiently use read and write performance of a semiconductor. For example, if an SAS controller has eight ports, and each SAS interface may transfer data at 6 Gbps, the total bandwidth is 8×6 Gbit/s=48 Gbit/s. The SAS has a function to group a plurality of links and transfer data through the links (called wide port or wide link). Thus, it is possible to sufficiently use the bandwidth.

In regard to the method in which a plurality of physical links are grouped and data is transferred through the physical ports, JP-A-2007-256993 discloses a storage system in which an SAS initiator controls how many physical links of a wide link are allocated to an SAS target. U.S. Patent Publication No. 2008/0104264 discloses a technology that transfers data through a wide port formed by grouping a plurality of physical links.

SUMMARY OF THE INVENTION

The hard disk drive of the SAS interface has a two-port connector, and the two ports are for redundantly used with respect to one another. For this reason, data transfer performance of one hard disk drive is 6 Gbit/s. The transfer rate is sufficient for the hard disk drive, but it is not sufficient for the SSD.

That is, the semiconductor memory may read and write data at high speed, and thus the configuration of the interface may become a bottleneck.

In the technology disclosed in JP-A-2007-256993, target SAS ports are two ports of an active port and a redundant port.

Logical partitioning of storage (LPAR) technology is known in which improvement in performance of the storage apparatus results in logical partition of the resources of the storage apparatus, such as the throughput of the controller, the storage capacity, and the like, and the logical partitions are independently provided to the users. In such an operation, in order to provide high performance to each user, it is necessary to eliminate bottlenecks from the logical partitions.

The technology disclosed in JP-A-2007-256993 does not disclose the logical partitioning on the target side into consideration.

In case of a storage system having a plurality of storage devices, which are different in reliability and performance, the performance and reliability of the storage device which become bottlenecks of the performance and reliability of the storage system. For this reason, it is also necessary to examine other causes for the bottlenecks (write data verification).

Specifically, in the known storage system, after data is written, written data is read out, and comparison is performed between write data and read data in the unit of a byte. In addition, comparison may be performed between a verification code of write data and a verification code of read data. In the known method, however, a transfer bandwidth is used in order to read out data, and the throughput of the processor is used for data comparison. The use of the transfer bandwidth and the throughput of the processor limits improvement in performance. The deterioration of performance causes a significant problem in a storage devices, such as an SSD, which performs a high-speed operation.

It is an object of the invention to provide a storage system that suppresses occurrence of a bottleneck in the storage system, efficiently uses a bandwidth of hardware, and achieves high reliability.

An embodiment of the invention is as follows. That is, a storage system includes a storage device that stores data, a controller that controls data input/output with respect to the storage device, and an interface that couples the storage device and the controller. The storage device has a plurality of physical ports that are coupled to the interface. The controller logically partitions a storage area of the storage device into a plurality of storage areas and provides the plurality of storage areas, or allocates the plurality of physical ports to the logically partitioned storage areas.

Another embodiment of the invention provides a storage system, the storage system including a storage device that stores data, a cache memory that temporarily stores data written in the storage device, a controller that controls data input/output with respect to the storage device, and an interface that couples the storage device, the cache memory, and the controller. When data is transferred from the cache memory to the storage device, the controller generates a verification code for securing validity of written data for each write block of data, transfers data with the generated verification codes to the storage device, and verifies data written in the storage device without using the verification codes added to data in one or a plurality of blocks starting with a head block from among the verification codes added to data written in a plurality of blocks of the storage device.

According to the embodiments of the invention, it is possible to improve performance of a storage system.

BRIEF DESCRIPTION OF THE DRAWINGS

FIG. 2 is a front view of a storage system according to the first embodiment of the invention;

FIG. 6B is a perspective view showing the internal structure of the semiconductor memory according to the first embodiment of the invention;

FIG. 9A is an explanatory view showing an example of logical partitioning of a storage area and path (bandwidth) allocation of the logically partitioned storage area according to the first embodiment of the invention;

FIG. 9B is an explanatory view showing an example of logical partitioning of a storage area and path (bandwidth) allocation of the logically partitioned storage area according to the first embodiment of the invention;

FIG. 9C is an explanatory view showing an example of logical partitioning of a storage area and path (bandwidth) allocation of the logically partitioned storage area according to the first embodiment of the invention;

FIG. 9D is an explanatory view showing an example of logical partitioning of a storage area and path (bandwidth) allocation of the logically partitioned storage area according to the first embodiment of the invention;

FIG. 9E is an explanatory view showing an example of logical partitioning of a storage area and path (bandwidth) allocation of the logically partitioned storage area according to the first embodiment of the invention;

FIG. 9F is an explanatory view showing an example of logical partitioning of a storage area and path (bandwidth) allocation of the logically partitioned storage area according to the first embodiment of the invention;

FIG. 10 is an explanatory view of configuration information for logical partitioning and path allocation shown in FIGS. 9A to 9F;

FIG. 13A is an explanatory view showing the configuration of a management table in a protocol control unit of a disk control unit according to the first embodiment of the invention;

FIG. 13B is an explanatory view showing the configuration of a management table in a protocol control unit of an SAS expander according to the first embodiment of the invention;

DETAILED DESCRIPTION OF THE INVENTION

Embodiments of the invention will now be described with reference to the drawings.

First Embodiment

Figure 1A:
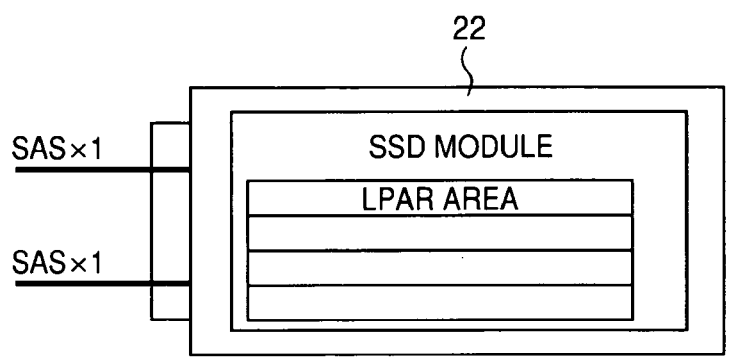
FIG. 1A is an explanatory view showing the overview of a first embodiment of the invention.
Figure 1B:
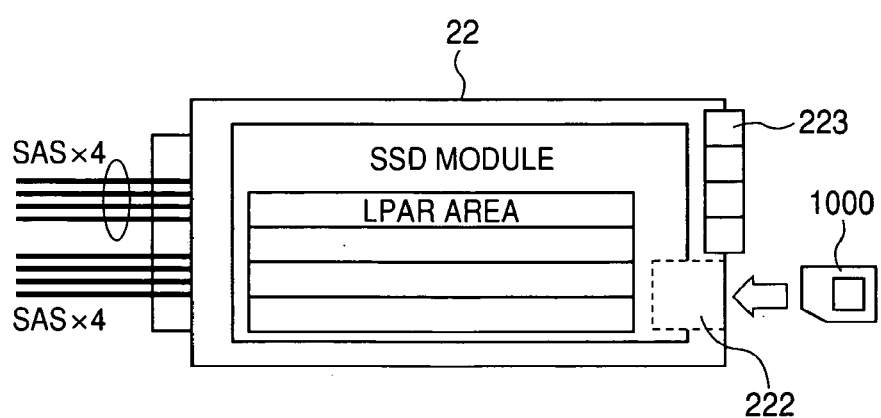
FIG. 1B is an explanatory view showing the overview of the first embodiment of the invention.

FIGS. 1A and 1B are explanatory views showing the overview of a first embodiment of the invention.

In general, a storage device 22 has one or a plurality of physical ports for data input/output. As shown in FIG. 1A, for example, a storage apparatus having an SAS interface has two physical ports. One of the two physical ports is used as an active port, and the other physical port is used as a standby port. Active and standby paths for data transfer with respect to a disk control unit are set by the ports. For this reason, even if the storage area of the storage device is logically partitioned, the partitioned storage areas are not mapped to the ports.

In contrast, as shown in FIG. 1B, a storage device of the first embodiment has eight physical ports. Of these, four ports may be used as active ports, and the other four ports may be used as standby ports. Paths for data transfer with respect to the disk control unit are set by the ports. In this case, four ports may be individually allocated to the logically partitioned storage areas, and data may be independently transferred to each storage area. Four temporally partitioned ports may be allocated to one storage area, and thus data may be transferred at high speed.

The storage device 22 of the first embodiment has LEDs 223 for displaying the load of the physical ports. The storage device 22 also has an interface (SD memory card slot 222) in which a secondary storage device (for example, an SD memory card 1000) providing a storage area as an alternate area is mounted. For this reason, even though an alternate area is insufficient, if the storage area of the SD memory card 1000 is used as the alternate area, the life of the storage device may be extended.

FIG. 2 is a front view of the storage system according to the first embodiment of the invention.

FIG. 2 shows one system controller unit 1 and three drive units 2. The system controller unit 1 and the drive unit 2, and the drive units 2 are coupled by an SAS interface.

The system controller unit 1 and the drive units 2 are the same appearance, but any one may have a different appearance.

Figure 3A:
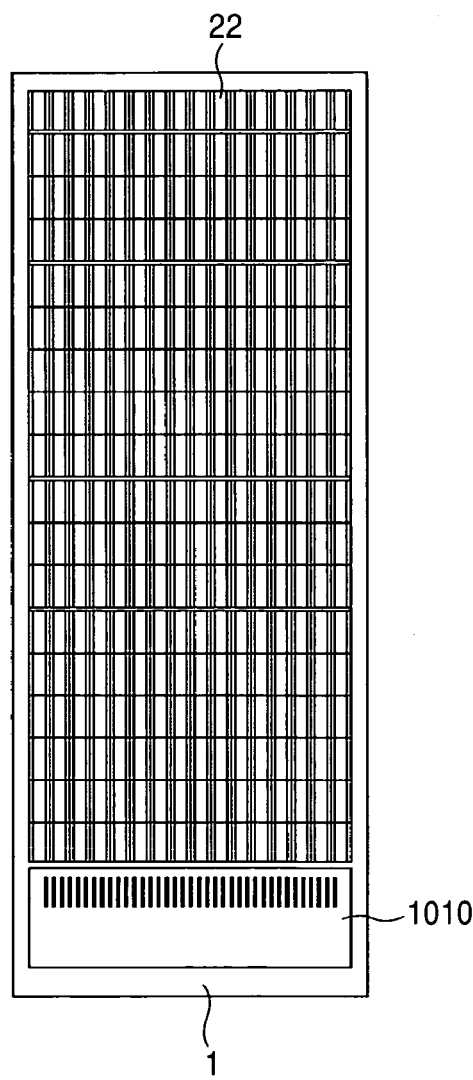
FIG. 3A is a diagram showing the internal structure of a system controller unit according to the first embodiment of the invention in a state where a front cover is open.

FIG. 3A is a diagram showing the internal structure of the system controller unit 1 according to the first embodiment of the invention in a state where a front cover is open.

A slot in which a solid state drive 22 (or a hard disk drive 21) is mounted is provided on the front side of the system controller unit 1. A power unit 1010 is provided in a lower portion on the front side of the system controller unit 1. The solid state drive 22 mounted in the system controller unit 1 is coupled by a backplane (not shown).

Figure 3B:
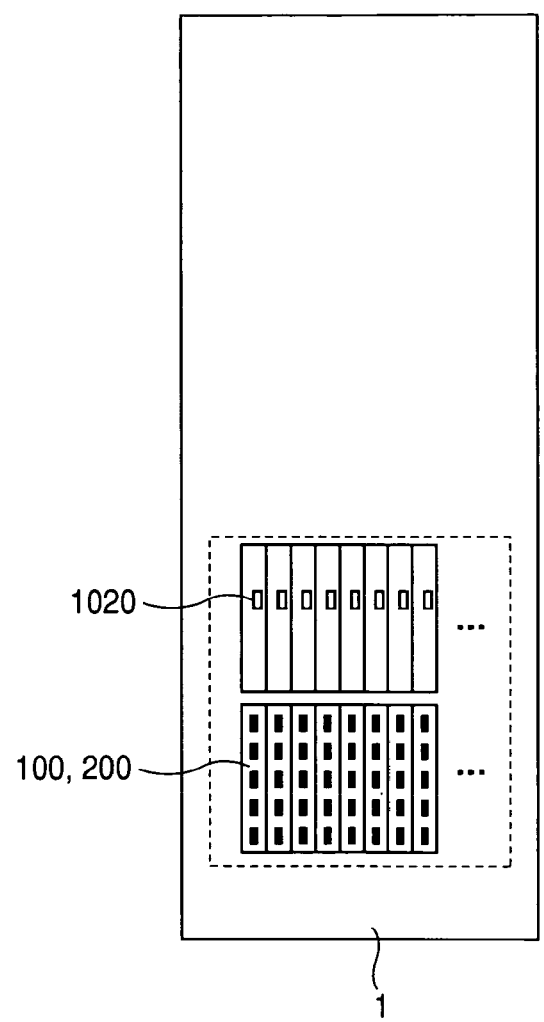
FIG. 3B is a diagram showing the internal structure of the system controller unit according to the first embodiment of the invention in a state where a rear cover is open.

FIG. 3B is a diagram showing the internal structure of the system controller unit 1 according to the first embodiment of the invention in a state where a rear cover is open.

A channel control unit 100 and a disk control unit 200 are provided in a lower portion on a rear side of the system controller unit 1. A controller unit 1020 is provided above the channel control unit 100 and the disk control unit 200, and has a processor 400, a memory 430, and a shared memory 450. A slot in which the solid state drive 22 (or the hard disk drive 21) is mounted may be provided at a place other than the channel control unit 100, the disk control unit 200, and the controller unit 1020.

The front side of the drive unit 2 has the same structure as the front side of the system controller unit 1 shown in FIG. 3A. The rear side of the drive unit 2 is provided with a slot in which the solid state drive 22 (or the hard disk drive 21) is mounted, like the front side of the system controller unit 1 shown in FIG. 3A.

Figure 4:
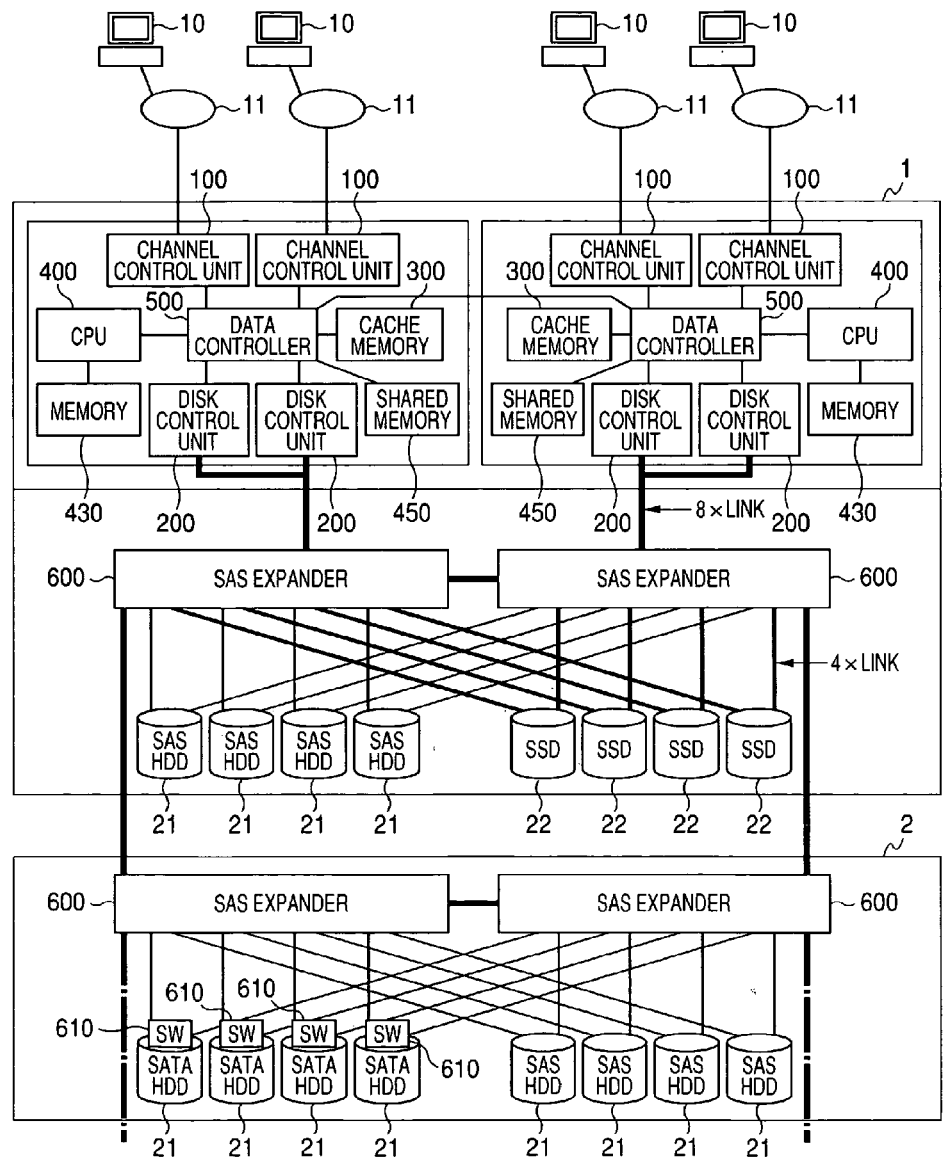
FIG. 4 is a block diagram showing the configuration of a storage system according to the first embodiment of the invention.

FIG. 4 is a block diagram showing the configuration of the storage system according to the first embodiment of the invention.

The storage system (the system controller unit 1) of this embodiment includes a plurality of channel control units 100, a plurality of disk control units 200, a cache memory 300, a processor 400, a memory 430, and a shared memory 450. The channel control units 100, the disk control units 200, the cache memory 300, the processor 400, the memory 430, and the shared memory 450 are coupled by a data controller 500. As shown in FIG. 4, the storage system 1 generally includes a plurality of channel control units 100 and a plurality of disk control units 200, but a single channel control unit 100 and a single disk control unit 200 may be provided.

The controller unit 1020 is formed by the cache memory 300, the processor 400, the memory 430, the shared memory 450, and the data controller 500.

Each of the channel control units 100 includes a physical interface that serves as a driver to input/output a signal based on a communication protocol with respect to a host computer 10, a protocol control unit that controls input/output of a signal based on a communication protocol with respect to the host computer 10, and a transfer control unit that controls an address of data to be transferred from the channel control unit 100 to the cache memory 300. The channel control unit 100 is coupled to the host computer 10 by an SAN (Storage Area Network) 11 using a fiber channel protocol. The channel control unit 100 and the host computer 10 may be coupled by Ethernet (Registered Trademark). In this case, the channel control unit 100 and the host computer 10 perform communication by an iSCSI protocol.

The disk control unit 200 includes a physical interface that serves as a driver to input/output a signal based on a communication protocol between the storage devices 21 and 22, a protocol control unit that controls input/output of a signal based on a communication protocol between the storage devices 21 and 22, and a transfer control unit that controls an address of data to be transferred from the disk control unit 200. In the storage system of this embodiment, the disk control unit 200 has four-port SAS (Serial Attached SCSI) interface. The disk control unit 200 and the storage devices 21 and 22 may be coupled by another coupling method insofar as it may make multi-port connection for allowing data to be transferred through a plurality of ports as a single link.

The storage system 1 of this embodiment uses the hard disk drive 21 and the semiconductor memory 22 as the storage apparatuses 21 and 22, but optical disks or magnetic tapes may be used. Although FIG. 4 shows the storage apparatuses 21 and 22, the storage system may have the storage apparatuses 21 and 22, or an additional sub-system having the storage apparatuses 21 and 22 may be coupled (in general, NAS or VTL).

The cache memory 300 temporarily stores data to be written by the host computer 10, and temporarily stores data to be read from the storage apparatuses 21 and 22.

The processor 400 controls the operations of the storage system (for example, an instruction to transfer data from the channel control unit 100 to the cache memory 300 and the like).

The memory 430 stores a program to be executed by the processor 400 and data required when the program is executed.

The shared memory 450 stores data to be commonly used by the individual units (for example, configuration information of the storage system).

The data controller 500 includes a switch (for example, crossbar switch) that couples the channel control units 100, the disk control units 200, the cache memory 300, the processor 400, the memory 430, and the shared memory 450. An internal network that couples the channel control units 100, the disk control units 200, the cache memory 300, the processor 400, the memory 430, and the shared memory 450 is constructed by the data controller 500. Data is transferred between the individual units through the internal network.

The storage system may have an interface (SVP) to which a service processor is coupled.

If a data write request is received from the host computer 10, the channel control unit 100 converts the received write request to a protocol in the storage system, analyzes an address of the protocol-converted write request, and sends the analysis result to the processor 400. The processor 400 decides a destination of the write request (data) on the basis of the analysis result of the address, and indicates the destination to the data controller 500. The data controller 500 turns the switch on such that data is transferred to the destination indicated by the processor 400, and thus data is transferred.

The write request (data) from the host computer 10 is transferred from the channel control unit 100 to the cache memory 300, and is temporarily stored in the cache memory 300. When data is stored in the cache memory 300 (even before data is stored in the storage apparatuses 21 and 22), a report on write completion is returned to the host computer 10. Thus, a response to the host computer 10 can be improved.

Data stored in the cache memory 300 is transferred to the disk control unit 200. The disk control unit 200 converts transferred data to a protocol (for example, SAS protocol) for data transfer to the storage apparatuses 21 and 22. Protocol-converted data is written in the storage apparatuses and 22.

The storage system 1 of this embodiment includes SAS expanders 600, the hard disk drives 21, and the semiconductor memories 22, in addition to the controller unit.

Each of the SAS expanders 600 includes a switch (for example, crossbar switch) that couples the disk control units 200, the hard disk drives 21, and the semiconductor memories 22, and transfers data between the disk control units 200 and the hard disk drives 21 (or the semiconductor memories 22). The SAS expander 600 is coupled to the storage apparatuses 21 and 22 by using ports corresponding to the number of connection destination storage apparatuses. For example, the SAS expander 600 and the semiconductor memory 22 are coupled by four active ports or four standby ports (eight ports in total).

The number of ports to be coupled between the SAS expander 600 and the hard disk drive 21 varies depending on an interface of the hard disk drive 21. For example, the hard disk drive having an SAS interface and the SAS expander 600 are coupled by one active port and one standby port. The hard disk drive having an SATA (Serial Advanced Technology Attachment) interface and the SAS expander 600 are coupled by one active or standby port. The SATA hard disk drive 21 has a single port. In this case, a port multiplexer 610 is provided in the interface of the hard disk drive 21 to change the number of ports. That is, one active port and one standby port (two ports in total) are changed to one port, and the SATA hard disk drive 21 is coupled to the SAS expander 600.

The SAS expander 600 is coupled to an SAS expander 600 of an additional unit (for example, the drive unit 2) by an SAS interface.

The hard disk drive 21 records data in a magnetic disk. The hard disk drive 21 is coupled to the disk control unit 200 through the SAS expander 600 by the SAS interface.

The semiconductor memory 22 is a so-called SSD (Solid State Drive) having a nonvolatile memory (for example, flash memory), and is coupled to the disk control unit 200 by the SAS interface. A memory device forming the semiconductor memory 22 is not limited to a flash memory, but a semiconductor device, such as M-RAM, P-RAM, STT-RAM, or racetrack memory, may be used.

In the storage system of this embodiment, the drive unit 2 includes SAS expanders 600 and hard disk drives 21. The drive unit 2 shown in FIG. 4 includes the hard disk drives 21, but it may include semiconductor memories 22, in addition to the hard disk drives 21.

Figure 5:
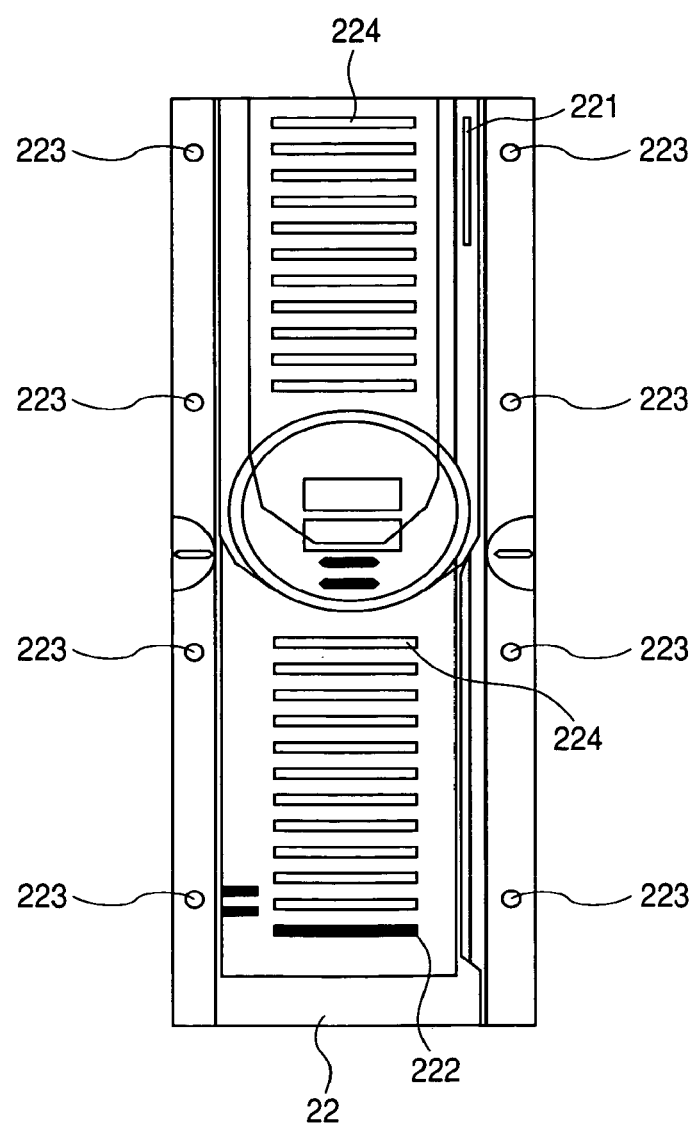
FIG. 5 is a front view of a semiconductor memory according to the first embodiment of the invention.

FIG. 5 is a front view of the semiconductor memory 22 according to the first embodiment of the invention.

The semiconductor memory 22 includes a latch release lever 221, an SD memory card slot 222, and status display LEDs 223 in its front surface. In the semiconductor memory 22, a front board, a base board, an expanded memory board 1, and an expanded memory board 2 are provided (see FIG. 6).

The latch release lever 221 is operated when the semiconductor memory 22 is removed from the system controller unit 1 (or the drive unit 2).

The SD memory card slot 222 is an interface that is used to mount the SD memory card 1000, which provides an alternate area to the semiconductor memory 22. Data to be written in the SD memory card 1000 is written after being encrypted by a control unit of the semiconductor memory 22.

The status display LEDs 223 includes four LEDs on each of the left and right sides (eight in total) in sets of red, blue, and green. Each of the status display LEDs 223 displays a load status of a corresponding one of the eight ports. For example, when a load is high, the LED 223 emits red, when a load is medium, the LED 223 emits yellow (red:normal+ green:normal), and when a load is low, the LED 223 emits green. In addition, when a load is extremely low, the LED 223 emits blue.

The operation status of the semiconductor memory 22 may be displayed by the status display LEDs 223, and may be used for maintenance. For example, when an error occurs in the semiconductor memory 22, the LED 223 emits red. When the allocable capacity of the alternate area is equal to or smaller than a threshold value, the LED 223 may emit orange (red: normal+green:reduction). In this case, a user can mount the SD memory card 1000 in the SD memory card slot 222 of the semiconductor memory 22, in which the status display LED 223 emits orange. Therefore, the semiconductor memory 22 can be continuously operated without being immediately replaced with a new one.

As such, if the status display LEDs 223 are provided in the front surface of the semiconductor memory 22 so as to be visually recognizable, the user can open the front cover of the unit to visually recognize the load status of the semiconductor memory 22 mounted in the storage system, and to intuitively understand the volume load. For this reason, volume migration for load balancing is easily performed.

A plurality of vent hole (air inlet) 224 are provided in the front surface of the semiconductor memory 22.

Figure 6A:
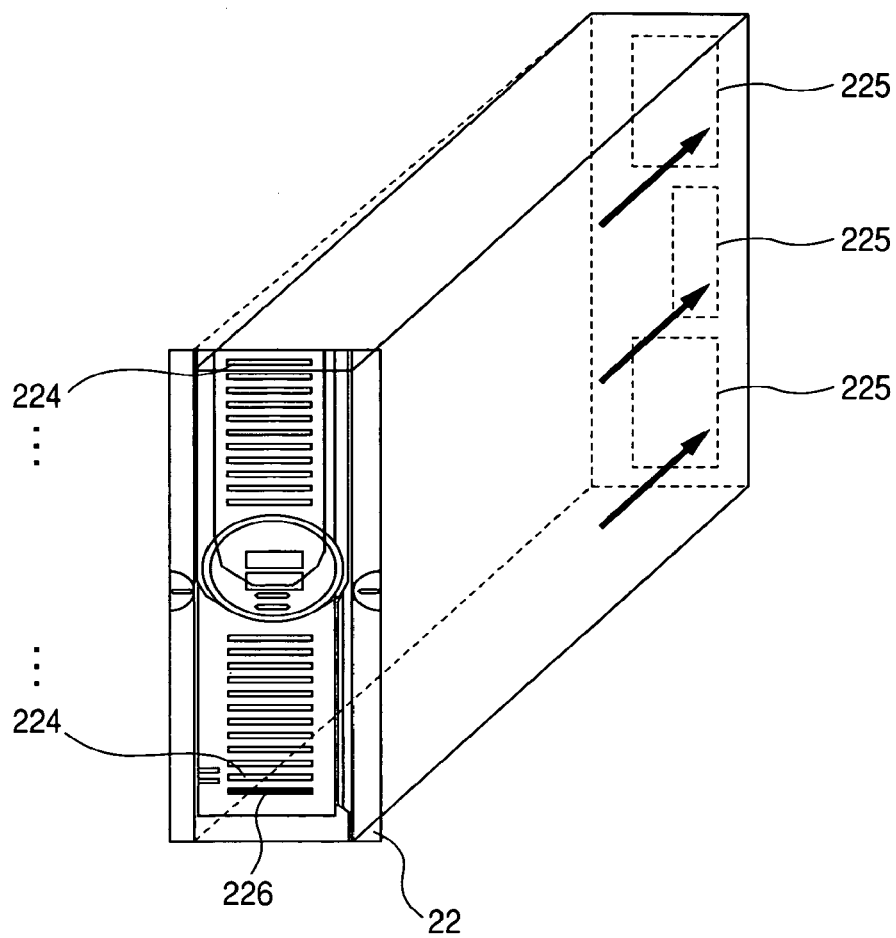
FIG. 6A is a perspective view showing the structure of a case of the semiconductor memory according to the first embodiment of the invention.

FIG. 6A is a perspective view showing the structure of a case of the semiconductor memory 22 according to the first embodiment of the invention.

The semiconductor memory 22 includes vent hole (air inlet) 224 in its front surface and vent hole (air outlet) 225 in its rear surface. For example, an exhaust fan is provided in a central portion of the system controller unit 1 so as to control air in the storage controller unit 1 from the front side to the central portion and from the rear side to the central portion. In this way, air flows from the front side of the semiconductor memory 22 to the rear side.

With this structure, while air induced from the front side of the HDD module, in which the hard disk drive 21 is mounted, flows the surface of the HDD, air can be induced into the semiconductor memory 22 (flows the inside of the SSD).

The semiconductor memory 22 has, in a lower portion of the front surface, a slot 226 into which the SD memory card 1000 is inserted.

FIG. 6B is a perspective view showing the internal structure of the semiconductor memory 22 according to the first embodiment of the invention.

The semiconductor memory 22 has a base board 2201, a front board 2202, and expanded memory boards 2203, 2204, and 2205.

The base board 2201 has an interface connector 228, a nonvolatile memory 2225 (see FIG. 7), control units 2222 and 2223 (see FIG. 7), connectors 2211, and stacking connectors 2212 and 2213. The connectors 2211 are coupled to the front board 2202. The stacking connectors 2212 are coupled to the expanded memory board 2203. The stacking connectors 2213 are coupled to the expanded memory board 2204.

The front board 2202 is attached to the base board 2201 by the connectors 2211. The front board 2202 has four status display LEDs 223 on each of the left and right sides (eight in total). The front board 2202 also has the SD memory card slot 222 in its lower portion.

The expanded memory board 2203 is attached to the base board 2201 by the stacking connectors 2212. The expanded memory board 2204 is attached to the base board 2201 by the stacking connectors 2213. The expanded memory board 2205 is attached to the expanded memory board 2203 by the stacking connectors 2214. The expanded memory boards 2203, 2204, and 2205 have nonvolatile memory devices.

The stacking connectors 2212, 2213, and 2214 are provided such that the longitudinal direction thereof extends from the front surface of the semiconductor memory 22 toward the rear surface. The semiconductor memory 22 of this embodiment is designed to let fresh air. For this reason, the longitudinal direction of the stacking connectors extends in parallel to the air flow such that the stacking connectors do not block the air flow.

Figure 7:
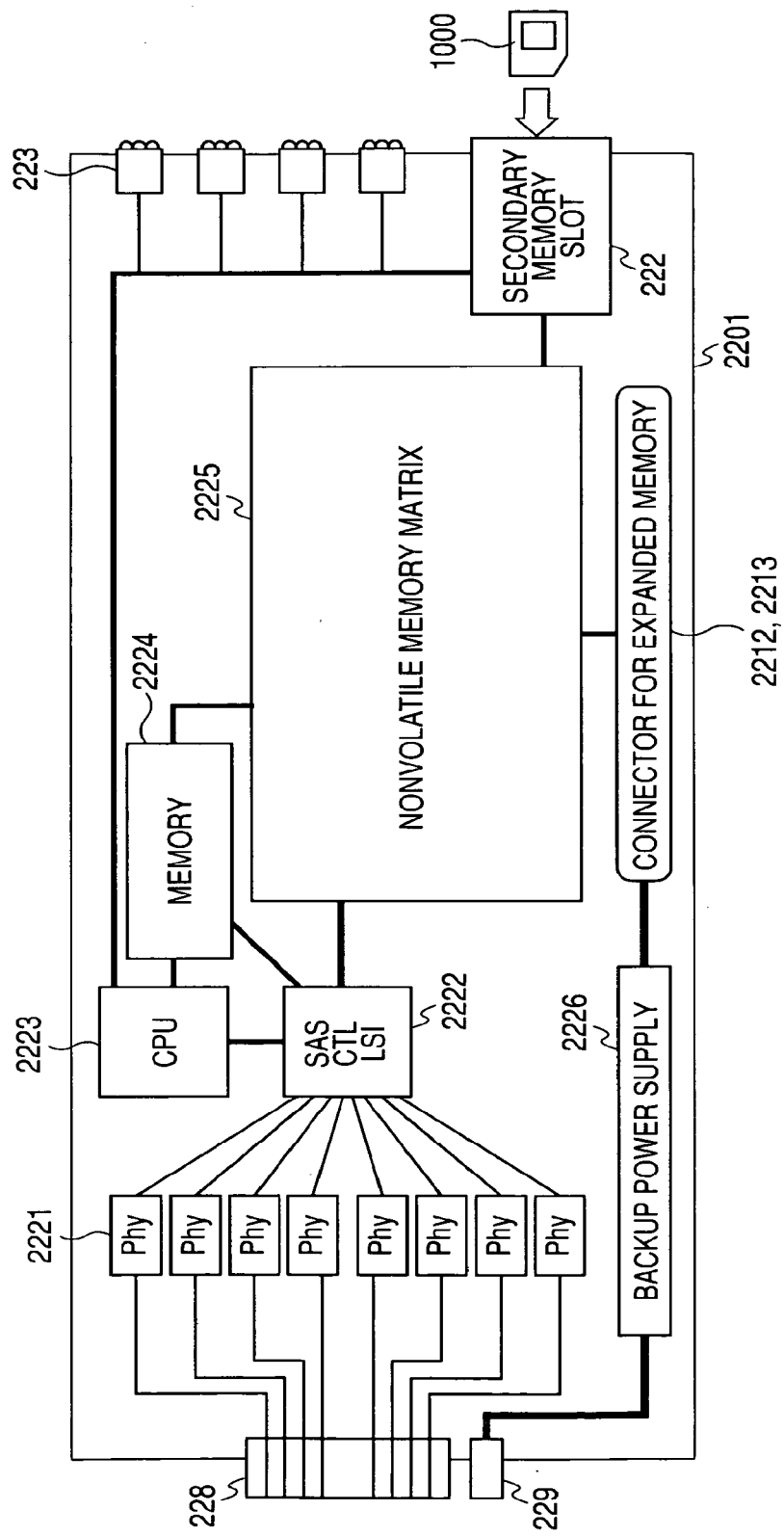
FIG. 7 is a block diagram showing the configuration of the semiconductor memory (base board) according to the first embodiment of the invention.

FIG. 7 is a block diagram showing the configuration of the semiconductor memory 22 (the base board 2201) according to the first embodiment of the invention.

The semiconductor memory 22 of the first embodiment has an interface connector 228, physical interfaces 2221, a protocol control unit 2222, a processor 2223, a memory 2224, a nonvolatile memory 2225, an SD memory card slot 222, status display LEDs 223, a power connector 229, a backup power supply 2226, and expanded memory connectors 2212 and 2213.

The interface connector 228 is a high-density connector accommodating an eight-port SAS interface, as described below with reference to FIGS. 8B and 8C.

The physical interface 2221 is a driver that inputs/outputs a signal based on the SAS protocol. The protocol control unit 2222 is a controller that controls input/output of a signal based on the SAS protocol.

According to the SAS standard, access may be performed to the eight physical ports with the same SAS address. For this reason, the ports (four active ports and four standby ports) of the semiconductor memory 22 of this embodiment may be controlled by the same logical interface as the known storage apparatus having two physical ports. When eight ports are used as active ports, the eight ports are used as standby ports. For this reason, two SAS addresses are needed for the active and standby ports. An SAS address may be set per link.

The processor 2223 executes a program stored in the memory 2224 to control the operation of the semiconductor memory 22, for example, to control input/output of data with respect to the nonvolatile memory 2225. The memory 2224 stores a program to be executed by the processor 2223 and data required when the program is executed. The nonvolatile memory 2225 is a memory that stores data to be transferred to the semiconductor memory 22.

The SD memory card slot 222 is an interface in which the SD memory card 1000, which provides an alternate memory area to the semiconductor memory 22, is mounted. Each of the status display LEDs 223 displays the load status of a corresponding one of the ports of the semiconductor memory 22 and the operation status of the semiconductor memory 22.

The power connector 229 is an interface that supplies power to the semiconductor memory 22. The backup power supply 2226 has a secondary battery or a large-capacity capacitor, and supplies power to the individual units of the semiconductor memory 22 for a predetermined time after power supply to the semiconductor memory 22 is cut off. The expanded memory connectors (stacking connectors) 2212 and 2213 are interfaces that couples the expanded memory board 2204.

Figure 8A:
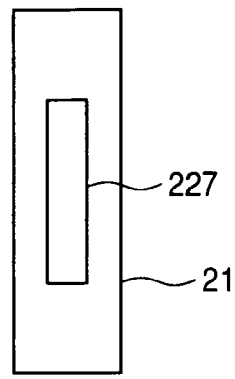
FIG. 8A is a diagram showing an example of allocation of an interface connector in a storage apparatus according to the first embodiment of the invention.
Figure 8B:
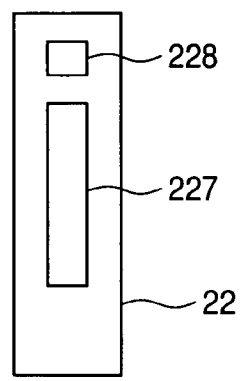
FIG. 8B is a diagram showing an example of allocation of interface connectors in the storage apparatus according to the first embodiment of the invention.
Figure 8C:
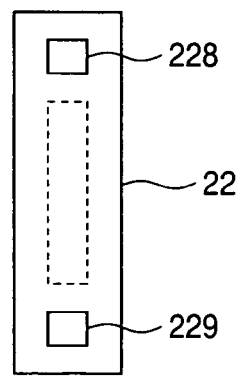
FIG. 8C is a diagram showing an example of allocation of an interface connector in the storage apparatus according to the first embodiment of the invention.

FIGS. 8A to 8C are diagrams showing examples of allocation of an interface connector of a storage apparatus (the hard disk drive 21 or the semiconductor memory 22) according to the first embodiment of the invention.

As shown in FIG. 8A, the hard disk drive 21 having an SAS interface has an SAS interface connector 227 that includes two data input/output ports.

As shown in FIG. 8B, the semiconductor memory 22 has the known SAS interface connector 227 and a high-density SAS interface connector 228 having a plurality of data input/output ports. In the example of FIG. 8B, eight ports may be coupled through the high-density SAS interface connector 228. Alternatively, two ports may be coupled through the known SAS interface connector 227, and six ports may be coupled through the high-density SAS interface connector 228. In addition, power is supplied to the semiconductor memory 22 through the known SAS interface connector 227.

As shown in FIG. 8C, the semiconductor memory 22 may have a high-density SAS interface connector 228 having a plurality of data input/output ports and a power connector 229. In the example of FIG. 8C, eight ports are provided through the high-density SAS interface connector 228. In addition, power is supplied to the semiconductor memory 22 through the power connector 229.

That is, in the storage system of this embodiment, the hard disk drive 21 and the semiconductor memory 22 may use necessary connectors such that the known SAS interface connector 227, the high-density SAS interface connector 228, and the power connector 229 do not interfere with each other. In this case, the hard disk drive 21 uses only two ports, and the semiconductor memory 22 uses eight ports.

FIGS. 9A to 9F are explanatory views showing examples of logical partitioning of a storage area and path (bandwidth) allocation to the logically partitioned storage areas according to the first embodiment of the invention.

In the semiconductor memory 22 of FIG. 9A, the storage area is not logically partitioned, and is provided as a single logical storage area. In this case, four active ports form a (total) logical link speed of 24 Gbit/s, and used as a wide link path through which data is transferred at high speed.

In the semiconductor memory 22 of FIG. 9B, the storage area is logically partitioned into two areas of the same capacity. In this case, four active paths form two multilink paths, a link speed of 12 Gbit/s, and two multilink paths through which data is transferred at high speed are configured. Each multilink path of 12 Gbit/s is assigned to a corresponding one of the logically partitioned storage areas. For this reason, each logically partitioned storage area may independently transfer data using a bandwidth of 12 Gbit/s. In the invention, the term "multilink" is used in order distinguish a technology, in which a link to be usable as a wide link is partitioned into a plurality of links, and each partitioned link may independently transfer data, from the wide link according to the related art.

In the semiconductor memory 22 of FIG. 9D, the storage area is logically partitioned into four areas of the same capacity. In this case, four active paths (four single-multilink paths) of 6 Gbit/s are individually allocated to the logically partitioned storage areas. For this reason, the logically partitioned storage areas may independently transfer data using a bandwidth of 6 Gbit/s.

In the semiconductor memories 22 of FIGS. 9A, 9B, and 9D, the ratio of the storage area partition and the ratio of the path partition are the same. However, according to the embodiment of the invention, the ratio of the storage area partition and the ratio of the path partition may not be the same.

For example, in the semiconductor memory 22 of FIG. 9C, the storage area is logically partitioned into three areas of the same capacity. In this case, four active paths are set as a multilink path of 12 Gbit/s and two single-multilink paths each of 6 Gbit/s. The multilink path of 12 Gbit/s is assigned to one logically partitioned area, and the single-multilink paths of 6 Gbit/s are assigned to the other two areas. Therefore, each logically partitioned storage area may transfer data using an independently assigned bandwidth of 12 Gbit/s or 6 Gbit/s.

In this way, if a single path or a multilink path having a plurality of logical paths is allocated to a logically partitioned storage area, it is possible to appropriately partition the entire bandwidth of the I/F according to the performance of the storage apparatus. Therefore, the performance of the semiconductor memory 22 which is readable and writable at higher speed than the hard disk drive can be efficiently used.

That is, when four active ports are used and the storage area is logically quadri-partitioned, if the number of partitioned storage areas is four or less, a port may be set per storage apparatus. The processor 400 transmits a mode select command to the semiconductor memory 22, and indicates the number of logical partitions and an address range of each of the partitioned areas. The semiconductor memory 22 associates the logically partitioned areas with the ports on the basis of the received a mode select command, and allocates an identifier (LUN) to each logically partitioned area.

When the storage area is partitioned into storage areas larger than the number of usable physical ports, in view of performance, it is preferable that the controller (the processor 400) specifies a storage area of an I/O target. When the throughput of the semiconductor memory 22 has a margin, the storage apparatus may determine a storage area of an I/O target.

As such, if the ratio of the storage area partition and the ratio of the path partition are not even, it is possible to provide logically partitioned storage areas according to the user's request.

The Logical partitioning of the storage apparatus may be combined with the logical partitioning of the storage system. In this way, it is possible to finely adjust the performance.

Next, an example of logical partitioning of a storage area and path (bandwidth) allocation of logically partitioned storage areas in the hard disk drive 21 will be described.

In the hard disk drive 21 of FIG. 9E, only one active path can be set, and accordingly it is impossible to logically partition the path insofar as a standby path is not used as an active path. Therefore, even though the storage area is partitioned into two areas, a path (bandwidth) of 6 Gbit/s is commonly used by two logically partitioned areas.

Like the hard disk drive 21 of FIG. 9F, when the storage area cannot be partitioned, a single active path is allocated to the storage area. Therefore, a path (bandwidth) of 6 Gbit/s is used by a single area.

FIG. 10 is an explanatory view of configuration information for logical partitioning and path assignment shown in FIGS. 9A to 9F.

The configuration information shown in FIG. 10 is managed by the processor 400, and stored in the shared memory 450. The configuration information includes host group 1701, logical partition group 1702, front end port 1703, system throughput 1704, cache capacity/mode 1705, back end zoning 1706, volume group 1707, drive type 1708, and logical partition allocation information (area information 1709, path information 1710).

The host group 1701 is an identifier of a group to which a host computer 10, which accesses a logical partition group (storage area), belongs. The logical partition group 1702 is an identifier of a logically partitioned storage area. The front end port 1703 is an identifier of a port of the channel control unit 100 which is used to access the logical partition group, and includes the number of ports which are used to access the logical partition group.

The system throughput 1704 indicates performance of an access process to the logical partition group. The cache capacity/mode 1705 indicates the capacity of the cache memory 300 which is used to access the logical partition group, and an access mode to the cache memory 300 (random access or sequential access). The back end zoning 1706 indicates the zoning type of a path under the disk control unit 200 which is used to access the logical partition group.

The volume group 1707 is an identifier of a logical volume which forms the logical partition group. The drive type 1708 indicates the type of a storage apparatus which forms the logical partition group.

The logical partition allocation information includes area information 1709 and path information 1710. The area information 1709 indicates the storage capacity forming the logical partition group. The path information 1710 indicates a bandwidth of a path which is used to access the logical partition group.

Estimated load 1711 is estimation of an access load to a logical partition group set in this table as an example.

Since the semiconductor memory 22 can respond at high speed, the capacity of the cache memory 300 may be allocated so as to be smaller than the hard disk drive 21. Referring to the configuration information of FIG. 10, in case of the hard disk drive 21, access performance rather than a data transfer rate becomes a bottleneck. Thus, a single port is allocated. However, in case of a hybrid-type hard disk drive having a nonvolatile semiconductor memory, or when the record density of the magnetic disk is improved and thus the performance of the hard disk drive is improved, like the semiconductor memory 22, a plurality of ports may be allocated.

Figure 11:
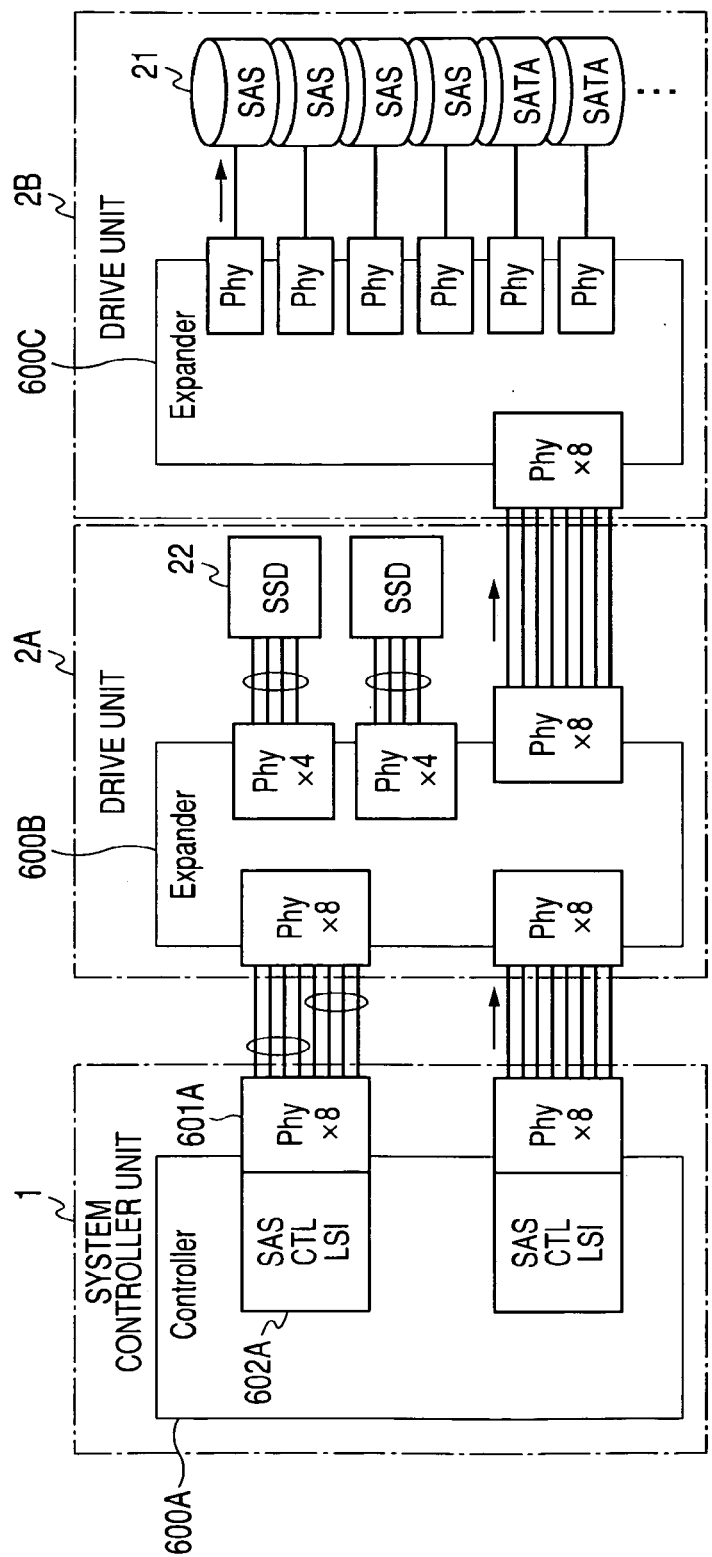
FIG. 11 is a diagram illustrating an example of links set in the storage system according to the first embodiment of the invention.

FIG. 11 is a diagram illustrating an example of links set in the storage system according to the first embodiment of the invention. In FIG. 11, only active links are shown, but standby links may be provided by the number of active links.

Protocol control units 602A on a controller 600A of the system controller unit 1 individually control eight physical interfaces 601A. Each of the physical interfaces 601A provides a single physical port, and each port forms a single link.

Among the links output from the system controller unit 1, links to the semiconductor memory 22 are grouped by four, and form two links of 24 Gbit/s. Links to the hard disk drive 21 form eight links of 6 Gbit/s.

An SAS expander 600B of a drive unit 2A coupled to the system controller unit 1 groups eight links from the system controller unit 1 by four, form two links of 24 Gbit/s, and provides the links of 24 Gbit/s to two semiconductor memories 22.

The SAS expander 600B of the drive unit 2A also output eight links of 6 Gbit/s to a drive unit 2B as they are. An SAS expander 600C of the drive unit 2B individually provides eight links of 6 Gbit/s to the hard disk drives 21.

That is, for data transfer to the semiconductor memory 22, a multilink having a plurality of links is used. Meanwhile, for data transfer to the hard disk drive 21, no multilink is used, but the paths are independently controlled. A multilink may be formed by part of links to the storage apparatus, and a multilink and an independent link may be combined to form a path.

Next, a virtual multilink will be described.

In this embodiment, four virtual links of maximum 12 Gbit/s are formed by a virtual multilink having four ports of 6 Gbit/s of the semiconductor memory 22.

An administrator logically partitions the storage area of the semiconductor memory 22 by a management computer coupled to the storage system (for example, through a management network), and forms a virtual storage per partitioned storage area.

The processor 400 of the storage system allocates the resources of the controller unit 1020 (the throughput of each control unit, the throughput of the processor, and the cache capacity) according to the administrator's instruction, and sets the zoning of the SAS expander 600. Thus, a pair of physical ports for a virtual multilink is set. In the semiconductor memory 22 in which a virtual multilink is used, logical partitioning and a virtual multilink are set.

After the multilink is set in the SAS expander 600 and the semiconductor memory 22, the processor 400 issues a multilink start command to the SAS expander 600. After the corresponding command is received, the SAS expander 600 starts link negotiation with the semiconductor memory 22 under the SAS expander 600. After the negotiation is completed, the SAS expander 600 starts an operation according to a configuration mode, and reports, to the processor 400, a notification purporting that the operation is enabled.

After the notification is received, the processor 400 sets the disk control unit 200 and the like such that a parallel process of logical partition groups to which simultaneously operable two pairs (for example, a port 0/1 and a port 2/3, and a port 1/2 and a port 0/3) belong is preferentially performed.

The disk control unit 200 monitors a process queue to be written from the controller, and controls a command execution sequence such that an I/O which can be parallel processed is preferentially executed. Therefore, the bandwidth can be efficiently used.

The SAS expander 600 can form a storage domain per logical partition by virtual zoning, in which a single physical port is allocated to a plurality of logical partitions, while a physical port is commonly used by a plurality of logical partitions.

A plurality of ports between the semiconductor memory 22 and the SAS expander 600 may be paused per logically partitioned link. A corresponding storage area of the semiconductor memory 22 may be paused in response to the pause of the port (link). As such, the operation of the storage system is suspended per logical partition, power consumption can be reduced.

Part of a plurality of ports between the semiconductor memory 22 and the SAS expander 600 may be paused according to a load of each logical partition.

FIGS. 12A to 12D are diagrams illustrating examples of set a link configuration in the storage system according to the first embodiment of the invention. In the examples of the link of FIGS. 12A to 12D, one or a plurality of links are time-divided and commonly used by a plurality of storage areas.

Figure 12A:
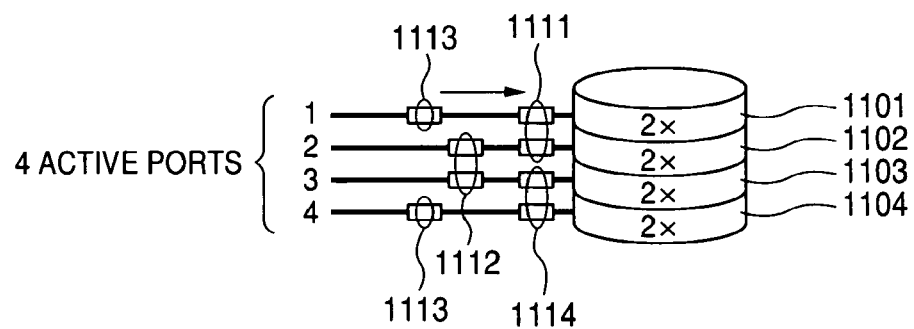
FIG. 12A is a diagram illustrating an example of links set in the storage system according to the first embodiment of the invention.

FIG. 12A shows an example of a virtual multilink which time-divided multilinks allocated to logically partitioned storage areas and transfers data.

The storage area is partitioned into four storage areas 1101 to 1104. Each port (link) is allocated so as to be commonly used by a plurality of storage areas. That is, the links 1 and 2 are allocated to the storage area 1101, and data 1111 is transferred to the storage area 1101 through the links 1 and 2. The links 2 and 3 are allocated to the storage area 1102, and data 1112 is transferred to the storage area 1102 through the links 2 and 3. The links 1 and 4 are allocated to the storage area 1103, and data 1113 is transferred to the storage area 1103 through the links 1 and 4. The links 3 and 4 are allocated to the storage area 1104, and data 1114 is transferred to the storage area 1104 through the links 3 and 4.

In this case, in transferring data to the semiconductor memory 22, the processor 400 or the disk control unit 200 checks an allocated port, and determines whether or not the port is free. Data is transferred such that a single logical link is formed by the free port.

As such, if each link is temporally partitioned, data can be transferred at maximum 12 Gbit/s in each storage area.

Figure 12B:
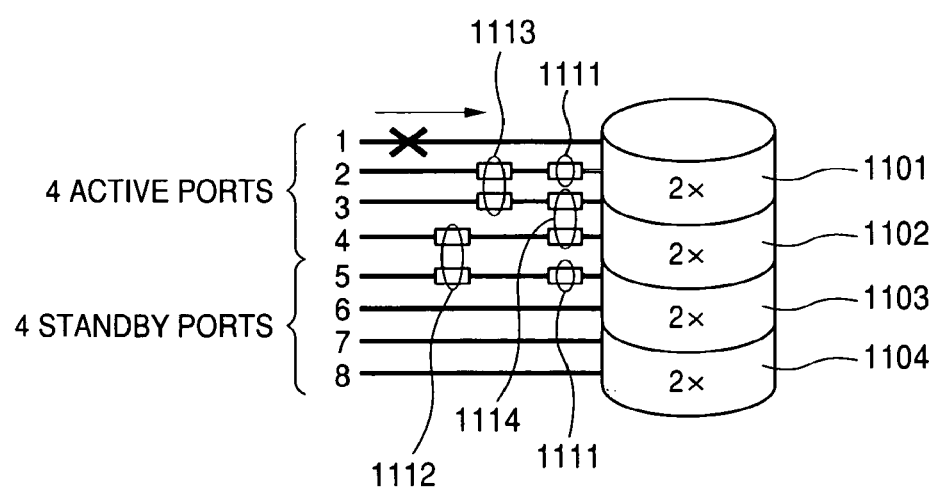
FIG. 12B is a diagram illustrating an example of links set in the storage system according to the first embodiment of the invention.

FIG. 12B shows a state where data is transferred through a standby link 5 when an error occurs in the link 1 of FIG. 12A.

Since an error occurs in the link 1, the standby link 5, instead of the link 1, is allocated as an active link.

For this reason, the links 2 and 5 are allocated to the storage area 1101, and data 1111 is transferred to the storage area 1101 through the links 2 and 5. The links 4 and 5 are allocated to the storage area 1103, and data 1113 is transferred to the storage area 1103 through the links 4 and 5. The link allocation to the storage areas 1102 and 1104 is the same as shown in FIG. 12A.

As such, in this embodiment, the active and standby paths may be freely combined to form a link. Therefore, even though an error occurs in part of the links, unlike the known wide link based on the SAS standard, it is not necessary to change all the grouped links. That is, when an error occurs in part of active paths, data may be transferred by changing only part of the erroneous paths and using part of standby links together. For this reason, even if an error occurs, data can be transferred using the same bandwidth as the normal state.

Figure 12C:
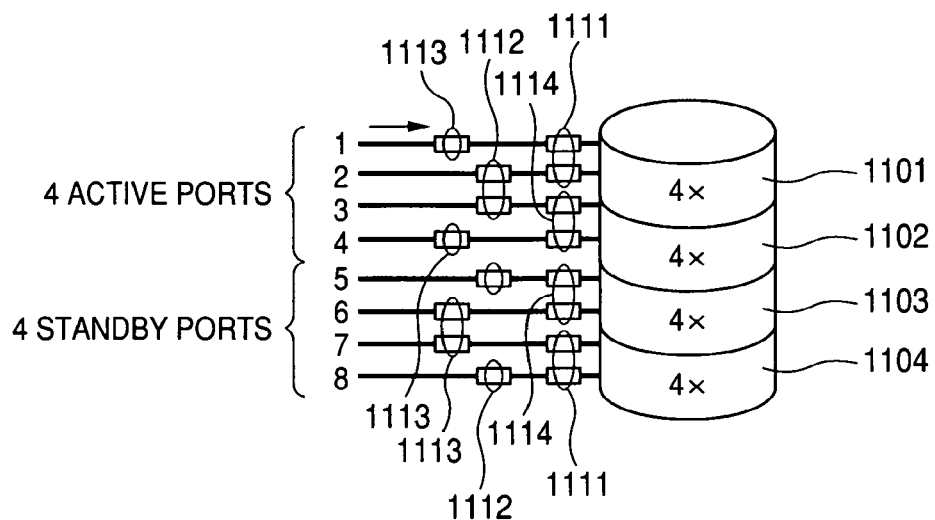
FIG. 12C is a diagram illustrating an example of links set in the storage system according to the first embodiment of the invention.

FIG. 12C shows an example where data is transferred though active links 1 to 4 and standby links 5 to 8 in the normal state.

The links 1, 2, 7, and 8 are allocated to the storage area 1101, and data 1111 is transferred to the storage area 1101 through the links 1, 2, 7, and 8. The links 2, 3, 5, and 8 are allocated to the storage area 1102, and data 1112 is transferred to the storage area 1102 through the links 2, 3, 5, and 8. The links 1, 4, 6, and 7 are allocated to the storage area 1103, and data 1113 is transferred to the storage area 1103 through the links 1, 4, 6, and 7. The links 3, 4, 5, and 6 are allocated to the storage area 1104, and the data 1114 is transferred to the storage area 1104 through the links 3, 4, 5, and 6.

As such, if the active and standby links are temporally partitioned, data can be transferred at maximum 24 Gbit/s in each storage area, and thus the data transfer bandwidth of the storage system can be efficiently used.

Figure 12D:
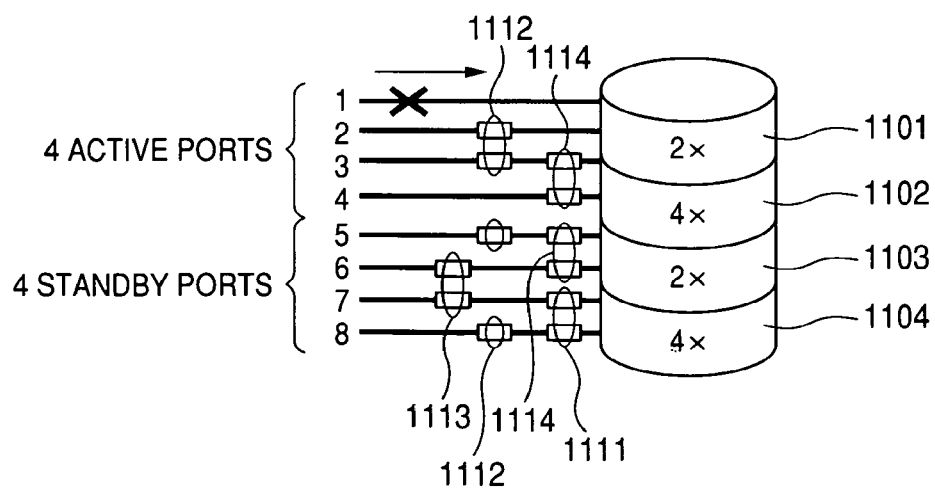
FIG. 12D is a diagram illustrating an example of links set in the storage system according to the first embodiment of the invention.

FIG. 12D shows a state in which, when an error occurs in the link 1 of FIG. 12C, the multilink using the link 1 is degraded data transfer to the storage area, and then data is transferred.

Since an error occurs in the link 1, the links 7 and 8 are allocated to the storage area 1101, and data 1111 is transferred to the storage area 1101 through the links 7 and 8. The links 6 and 7 are allocated to the storage area 1103, and data 1113 is transferred to the storage area 1103 through the links 6 and 7. The link allocation to the storage areas 1102 and 1104 are the same as shown in FIG. 12C.

As such, in this embodiment, the active and standby ports can be freely aggregated to form a link. Therefore, unlike the known wide link based on the SAS standard, it is not necessary to change all the grouped links. That is, it is not necessary to prepare the standby paths having the same bandwidths as the active paths. For this reason, when an error occurs in part of the paths, the part falls back, and then data transfer can be continuously performed.

FIG. 13A is an explanatory view showing the configuration of a management table 1200 to be managed by the processor 400 according to the first embodiment of the invention.

The management table 1200 represents the relationship between the logically partitioned storage areas and the ports of the disk control unit 200, and includes logical partition group 1201, virtual multilink 1202, target port 1203, and disk group 1204.

The logical partition group 1201 is an identifier of a logical partition of the logically partitioned storage system. The virtual multilink 1202 indicates the number of links to be used as a virtual multilink. The target port 1203 is an identifier of a port of the disk control unit 200. The disk group 1204 is an identifier of a port of the SAS expander 600 (a storage apparatus coupled to the port).

An entry 1205 of the management table 1200 indicates port allocation in the normal state, and an entry 1206 indicates port allocation when an error occurs in a port A0.

FIG. 13B is an explanatory view showing the configuration of a management table 1210 to be managed by the SAS expander 600 according to the first embodiment of the invention.

The management table 1210 represents the relationship between the logically partitioned storage areas and the ports of the SAS expander 600, and includes physical port 1211, virtual zone group 1212, virtual multilink 1213, and mapping information of physical link 1214.

The physical port 1211 is an identifier of a port of the SAS expander 600. The virtual zone group 1212 is an identifier of a logical partition of the logically partitioned storage system. The virtual multilink 1213 indicates the number of links to be used as a virtual multilink. The physical link 1214 is an identifier of a physical link.

As will be apparent from the management table 1210, a virtual link corresponds to a single zone, and a physical link is shared by a plurality of zones.

Figure 14:
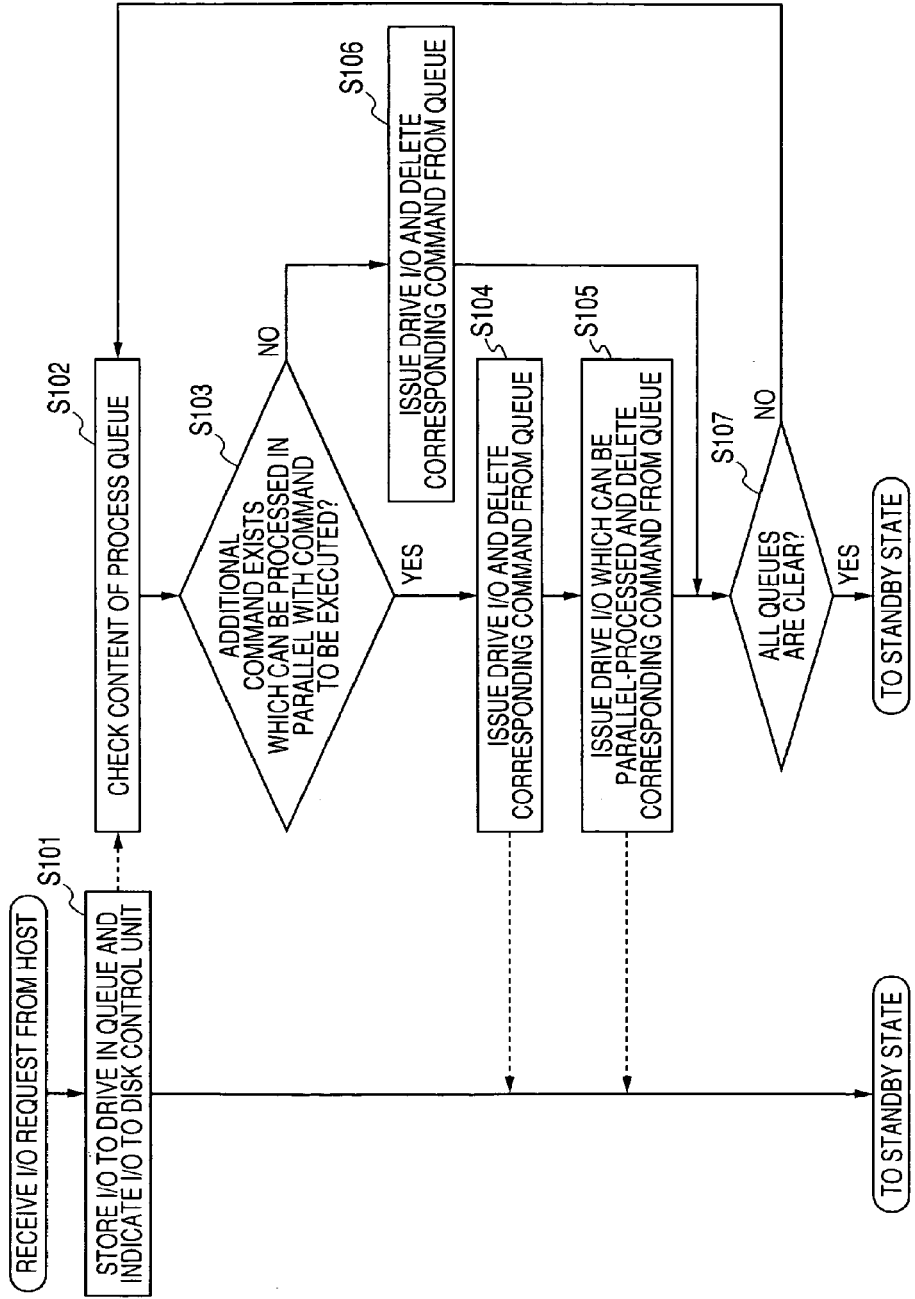
FIG. 14 is a flowchart of a process to be executed by a processor and a disk control unit of a system controller unit according to the first embodiment of the invention.

FIG. 14 is a flowchart of a process to be executed by the processor 400 and the disk control unit 200 in the system controller unit 1 according to the first embodiment of the invention.

First, when an I/O request (write request, read request) is received from the host computer 10, the processor 400 stores a command for executing I/O to the storage apparatuses 21 and 22 in a process queue, and indicates, to the disk control unit 200, notify that the command is stored in the process queue (S101).

After receiving the notify of the command is stored in the process queue, the disk control unit 200 reads out the command stored in the process queue (S102). The disk control unit 200 determines whether or not there is a command which can be parallel executed together with the command read from the process queue (S103).

As the determination result, when there is a command which can be parallel executed together with the command read from the process queue, the disk control unit 200 executes an executable command together with the command read from the process queue (that is, an I/O command corresponding to a command to be executed is output to the SAS interface (the SAS expander 600)). After both commands are executed, the command read from the process queue is deleted from the queue (S104), and the parallel executed command is deleted from the queue (S105). Subsequently, the process progresses to Step S107.

When there is no command which can be executed together with the command read from the process queue, the disk control unit 200 executes the command read from the process queue. After the command is executed, the read command is deleted from the process queue (S106). Subsequently, the process progresses to Step S107.

In Step S107, the disk control unit 200 determines whether or not a command is stored in all the process queues. As the determination result, when no command is stored in the process queues, the process returns to a standby state. When one is stored in a process queue, the process returns to Step S102, and a command stored in the process queue is processed.

Figure 15:
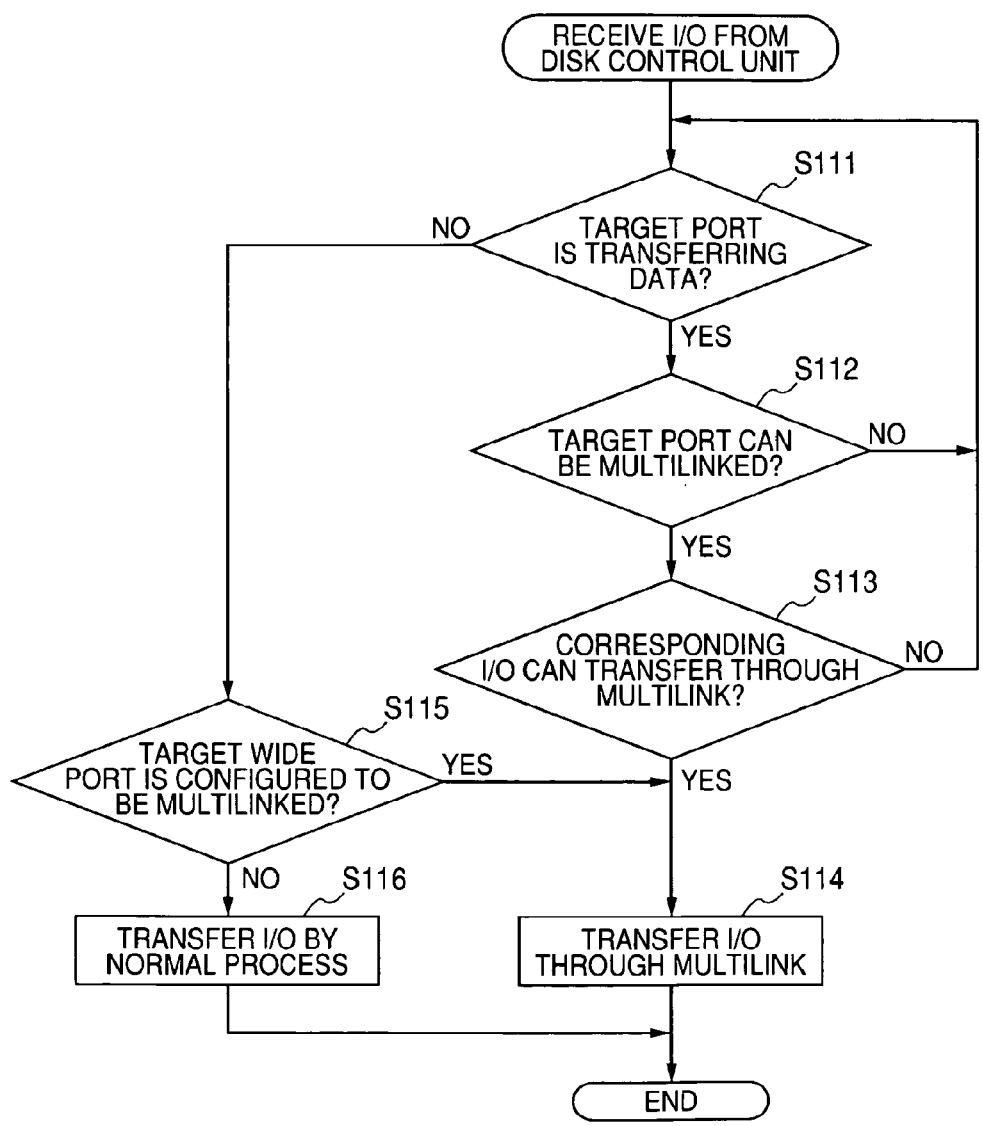
FIG. 15 is a flowchart of a process to be executed by an SAS expander of a system controller unit according to the first embodiment of the invention.

FIG. 15 is a flowchart of a process to be executed by the SAS expander 600 in the system controller unit 1 according to the first embodiment of the invention.

When an I/O command is received from the disk control unit 200, the SAS expander 600 refers to the status of a port through which data is to be transferred according to the I/O command, and determines whether or not the port is transferring data (S111).

As the determination result, when the port through which data is to be transferred according to the I/O command is transferring data, with reference to the management table 1210 (see FIG. 13B), it is determined whether or not the port is a port to be multilinked (S112).

As the determination result, when the port is a port to be multilinked, it is determined whether or not the I/O can be transferred through the multilink (S113).

As the determination result, when the I/O can be transferred through the multilink, the I/O is processed by the multilink (data is transferred) according to the received I/O command (S114).

When the port is not a port to be multilinked (NO in S112), or when the I/O cannot be transferred through the multilink (NO in S113), the process returns to Step S111, and it waits for until a port through which data is to be transferred is free.

When the port through which data is to be transferred according to the I/O command is not transferring data (NO in S111), it is determined whether or not a port through which data is transferred is a port to be multilinked (S115).

As the determination result, when the port is a port to be multilinked, the I/O is processed (data is transferred) according to the received I/O command (S114).

When the port is not a port to be multilinked, the I/O is normally processed (data is transferred) according to the received I/O command (S116).

Figure 16:
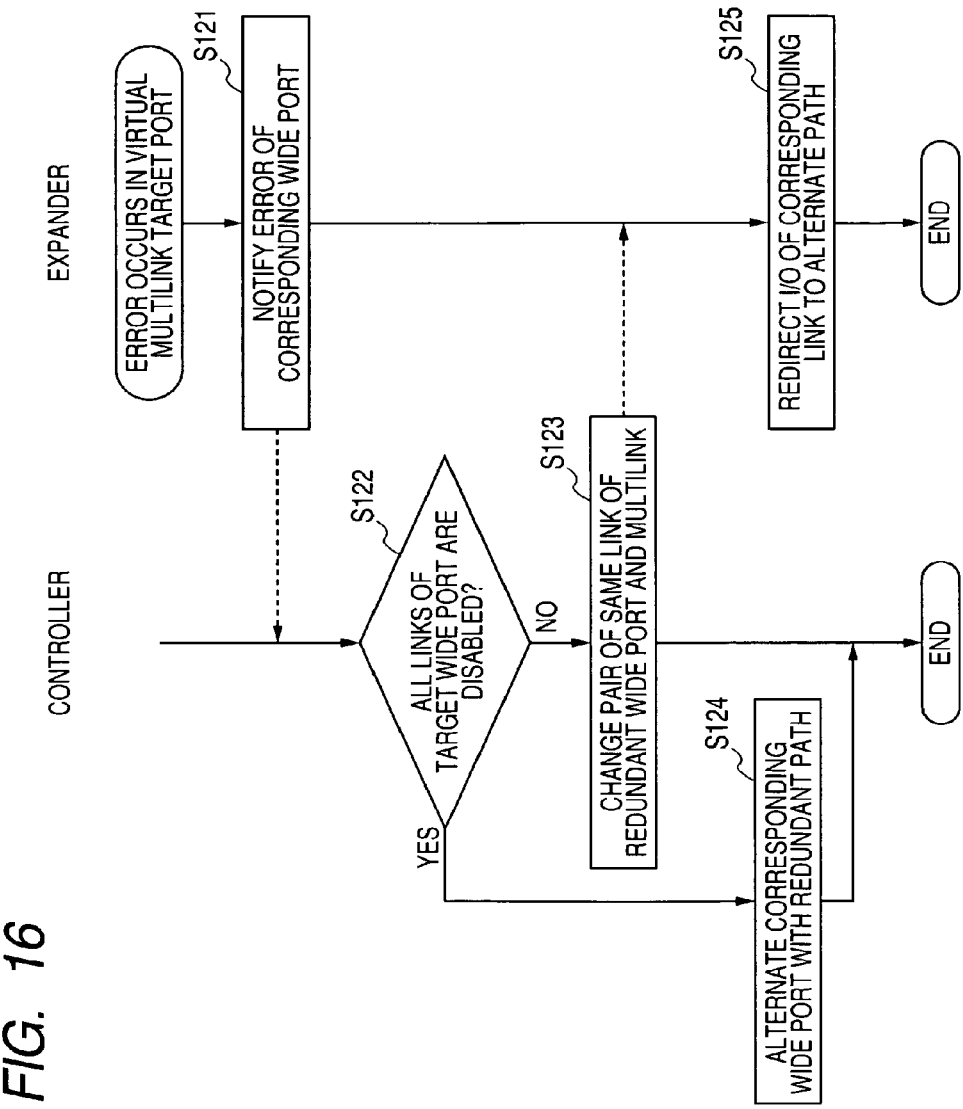
FIG. 16 is a flowchart of a path change process according to the first embodiment of the invention when an error occurs.

FIG. 16 is a flowchart of a path change process according to the first embodiment of the invention when an error occurs. With the path change process (alternate process) shown in FIG. 16, a path is changed, as shown in FIG. 12B.

After an error is detected in a port forming a virtual multilink, the SAS expander 600 notifies the port, in which an error occurs, to the disk control unit 200 (S121).

The disk control unit 200 refers to the management table 1200 (see FIG. 13A) and determines whether or not all the links of a wide link having a port, in which an error is detected, are disabled (S122).

As the determination result, when all the links of the wide link having the link, in which an error is detected, are disabled, a path is changed to a standby port corresponding to the port (S124).

When part of the wide link having the port, in which an error is detected, is usable, a pair of links in the multilink is changed, and the path change is notified to the SAS expander 600 (S123).

After the path change is notified, the SAS expander 600 redirects the I/O of the corresponding link to the changed path (S125).

In case of a path change of FIG. 12D, the number of links to be used in the virtual multilink having the path, in which an error occurs, is reduced (degraded).

As described above, in the first embodiment, one path or a multilink path is allocated to a logically partitioned storage area. Therefore, the entire bandwidth of the I/F can be appropriately partitioned according to the performance of the storage apparatus, and as a result the performance of the storage system can be improved.

Second Embodiment

Next, a second embodiment of the invention will be described.

In the known storage system, a verification code is added to data in a predetermined write unit with respect to the storage apparatus to verify that data is correct. For example, in case of a semiconductor memory (so-called SSD) and an SATA disk drive, a verification code, such as LA or LRC, is added to data for every 512 bytes. In case of an FC disk drive, a verification code is added to data for every 520 bytes.

When the controller issues a write command to the storage apparatus, data may not be written in the storage apparatus. For this reason, in the related art, after data is written, written data is read, and comparison is performed between write data and read data by one byte. Alternatively, comparison is performed between all the verification code of write data and all the verification code of read data.

However, in the known method, a transfer bandwidth is used in order to read out all written data, and the throughput of the processor is used for data comparison. The use of the transfer bandwidth and the throughput of the processor limits improvement in performance. The deterioration of performance causes a significant problem in a storage apparatus, such as a semiconductor memory, which performs a high-speed process.

In order to solve this problem, a method is suggested in which comparison is performed only between data in the head and last blocks for sequential data (for example, see JP-A-2005-165443). In this method, however, there is a problem in that a large overhead is required to generate/issue two commands for one write operation and to check the status. This large overhead leads to deterioration of throughput.

In order to solve this problem, in the second embodiment, data verification is performed by using a verification code added to data in a last block or verification codes added to data in several blocks starting with the last block from among verification codes added to data in a plurality of blocks of the storage apparatus.

In the second embodiment, the verification code is, for example, of eight bytes. For example, an address verification code (a sequential number, such as an address in a RAID), a successive verification code (an identifier to be generated each time data is written, a serial number of written data, or a flag indicating the head and tail of data), a data verification code (a code, such as CRC or ECC, for data verification), and/or a data attribute code (a code indicating data type (read only or parity)) may be used.

Figure 17A:
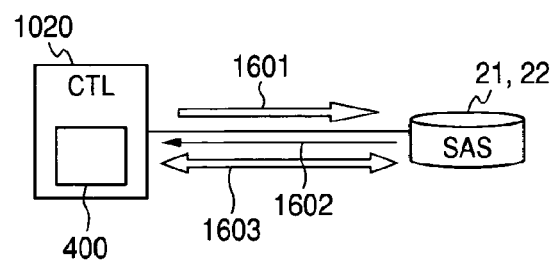
FIG. 17A is a diagram illustrating the overview of a second embodiment of the invention.
Figure 17B:
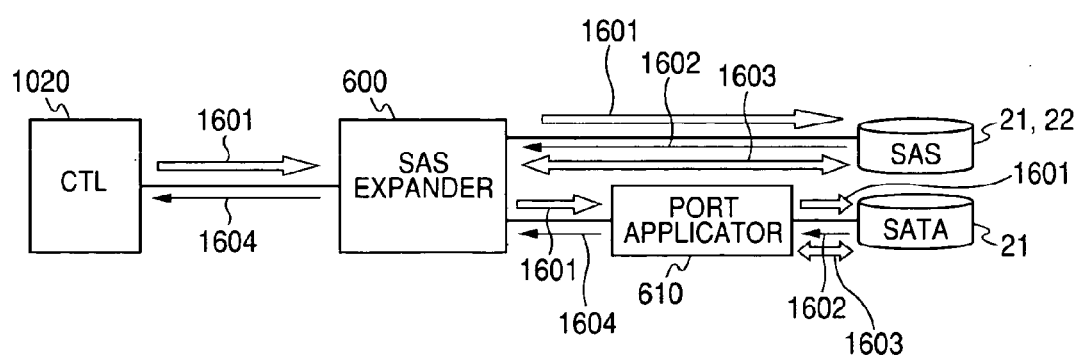
FIG. 17B is a diagram illustrating the overview of the second embodiment of the invention.

FIGS. 17A and 17B are diagrams showing the overview of the second embodiment of the invention.

As shown in FIG. 17A, after the last block is written in a storage apparatus (the hard disk drive 21 or the semiconductor memory 22) (1601), the processor 400 (the controller unit 1020) issues a read command to read after the written data, and reads out the written data (1602). Comparison is performed between the verification code of the write data and the verification code of the read data (1603). As a result, when verification is successful, the processor 400 returns a write response to the host computer 10. When verification is failed (when the verification code of write data is not identical to the verification code of read data), the processor 400 reports an error to the host computer 10. In the second embodiment, the processor 400 issues the read command to read out data of the last block (or several blocks starting with the last block), and performs comparison only between the verification codes of the last blocks (or several blocks starting with the last block).

As shown in FIG. 17B, in case of verification of write data according to the second embodiment, instead of the processor 400, the SAS expander 600 or the port applicator 610 coupled to the HDD may perform comparison between the verification code of write data and the verification code of read data (1603).

In this case, after the last block is written in the storage apparatus 21 or 22 (1601), the SAS expander 600 (or the port applicator 610) holds the WRITE status of the storage apparatus 21 or 22, and reads out data of the last block (or several blocks starting with the last block) from the storage apparatus (1602). Subsequently, the SAS expander 600 performs comparison between the verification code of write data and the verification code of read data (1603). As a result, when verification is successful, the SAS expander 600 returns the held WRITE response to the controller unit 1020 (1604). When verification is failed, an error is notified to the controller unit 1020 (1604).

In this way, if the SAS expander 600 or the port applicator 610 verifies write data, a load on a verification process of write data can be balanced, and a load on the controller can be reduced.

The storage apparatus 21 or 22 may verify write data. In this way, if the storage apparatus 21 or 22 verifies write data in a distributed manner, a load on the controller can be reduced.

In this embodiment, the amount of data to be processed during the data verification process executed by the processor 400 (the SAS expander 600 or the port applicator 610) is small. Therefore, a response time of the WRITE operation can be reduced, and the time-out of the controller unit 1020 can be suppressed. In addition, write data can be verified with high reliability while the throughput of the CPU and the data transfer bandwidth to be used in the verification process can be reduced.

In the verification of write data according to the second embodiment, when a predetermined condition is satisfied, comparison may be performed between all the verification codes of the written blocks, thereby improving reliability. The predetermined condition is, for example, within a predetermined time before data is written, when the controller 1020 detects an error in the storage apparatus 21 or 22, or when an error occurs during a data write operation or during verification data read operation. In such a case, the operation of the storage apparatus 21 or 22 may become unstable, or a failure occurs in the storage apparatus 21 or 22. Therefore, verification of all written data ensures improvement in reliability of the data write operation.

All written data may be verified periodically (for example, for every predetermined time). In this case, an error in the storage apparatus 21 or 22 can be detected early, and thus reliability of the data write operation can be improved.

If the range of data to be read for comparison of the verification codes is extended, it is possible to increase a possibility that data inconsistency by the verification codes is detected. That is, since the number of verification codes to be read for comparison increases, and thus a possibility that an abnormal verification code is generated increases.

A management code for each write operation may be inserted into the verification code, and comparison may be performed between the verification codes. As the management code, information for verifying data continuity, such as an identifier to be generated each time data is written, a serial number of written data, or a flag indicating the head and tail of data, may be used.

Figure 18:
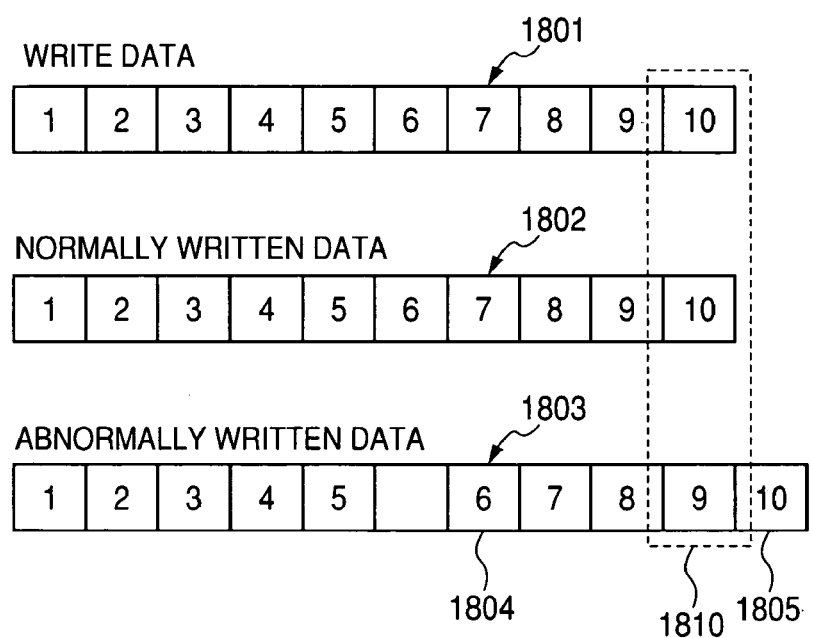
FIG. 18 is an explanatory view showing an error detection model according to the second embodiment of the invention.

FIG. 18 is an explanatory view showing an error detection model according to the second embodiment of the invention.

FIG. 18 shows, for example, a case in which data 1801 of ten blocks is written. When data is normally written in the storage apparatus 21 or 22, tenth data is written into a tenth sector (1802).

When the write operation suspends due to an interrupt caused by a high priority internal process in the storage apparatus 21 or 22, after the interrupt is ended, the storage apparatus 21 or 22 may resume the write operation from a shifted sector 1804. Though it is a bug, a case in which recurrence or extraction is difficult, such as interrupt competition under a specific condition, may be unnoticed, and as a result, an unexpected situation occurs. In such a case, it may be impossible to detect an error in the storage apparatus 21 or 22.

In this case, however, if data of the last one block is read out, it is possible to verify that data is normally written (1801). In addition, if data of one block before and after the last block is read out, it is possible to check data continuity and an influence on an area 1805 other than a target area of the write operation.

Whether only data of the last block is read out or data of several blocks before and after the last block is read out may be determined by the administrator or the user's setting. Alternatively, when written data is larger than a predetermined threshold value, data of a plurality of blocks may be read out for verification. Specifically, when written data is equal to or larger than a RAID stripe size, data of a plurality of blocks may be read out for verification. In addition, when the ratio of a write data length and a read data length is larger than a predetermined threshold value, data of a plurality of blocks may be read out for verification. When an area to be used for the data write operation is larger than a predetermined threshold value, data of a plurality of blocks may be read out for verification. When the load of the storage apparatus is larger than a predetermined threshold value, data of a plurality of blocks may be read out for verification.

As such, if the length of data to be read for verification is controlled by the length of written data, reliability can be improved.

Figure 19:
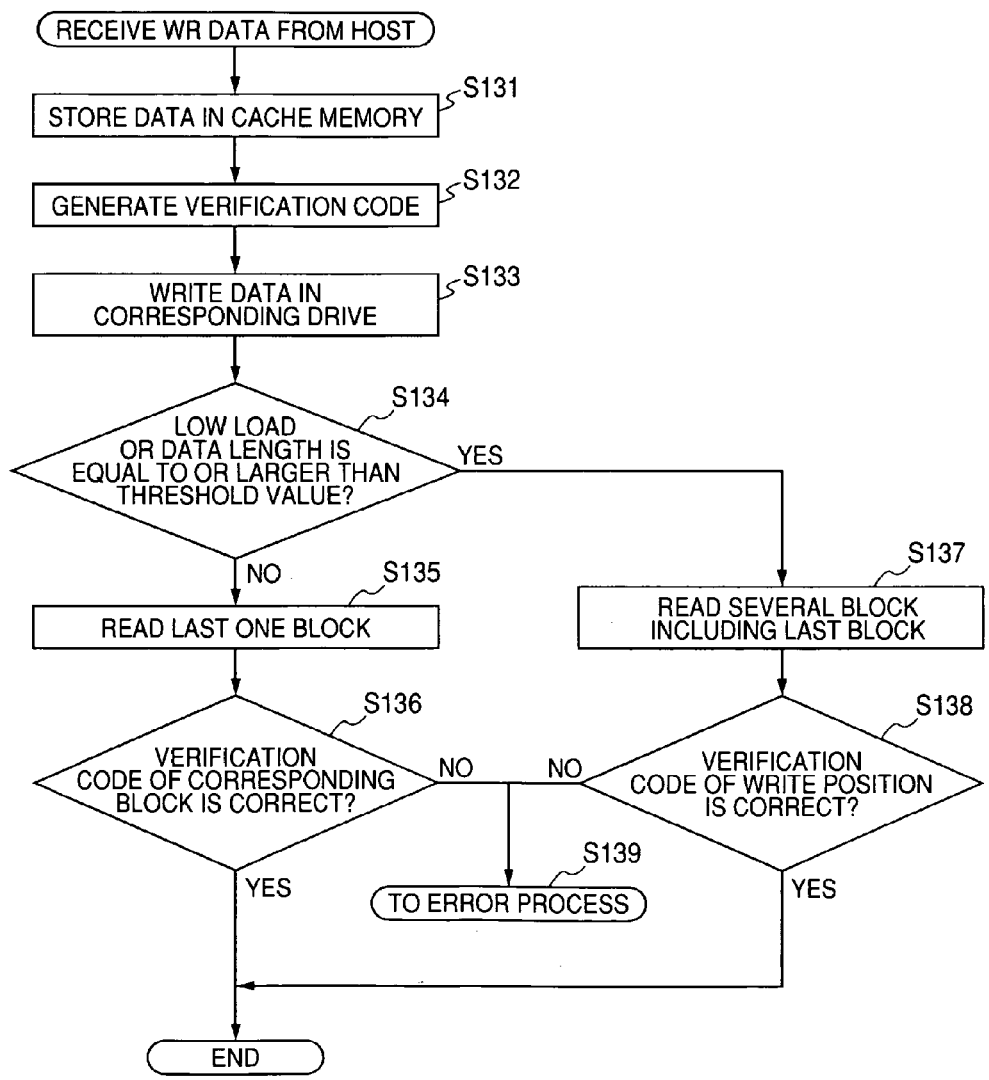
FIG. 19 is a flowchart of a data verification process according to the second embodiment of the invention.

FIG. 19 is a flowchart of a data verification process to be executed by the processor 400 according to the second embodiment of the invention.

First, if write data is received from the host computer 10, the channel control unit 100 stores received data in the cache memory 300 (S131). Next, the processor 400 reads out data stored in the cache memory 300, and generates the verification code of data received from the host computer 10 (S132). The processor 400 generates a write command, and writes data in a target storage apparatus (S133).

Subsequently, the processor 400 determines whether or not the load of the processor 400 is lower than a predetermined threshold value and whether or not the length of data to be written exceeds a predetermined threshold value (S134).

As the determination result, when the load of the processor 400 is low, or when written data is long, data of a predetermined number of blocks including the written last block is read out (S137), and performs comparison between the read verification code and the verification code of write data to determine whether or not both are identical (S138). As a result, when both are not identical, it is determined that data is not correctly written, and an error process is executed (S139). When both are identical, it is determined that data is correctly written, and the data verification process ends.

As the determination result in Step S134, when the load of the processor 400 is high or when the written data is short, data of the written last block is read out (S135), and comparison is performed between the read verification code and the verification code of write data to determine whether or not both are identical (S136). As a result, when both are not identical, it is determined that data is not correctly written, and the error process is executed (S139). When both are identical, it is determined that data is correctly written, the data verification process ends.

As described above, in the second embodiment, the bandwidth to be used for verification of write data is reduced. Therefore, excellent performance is achieved. As a result, it is possible to meet the user's request for high performance.

Unlike the technology disclosed in JP-A-2005-165443, the second embodiment can be applied regardless of whether or not write data is sequential data.

In the second embodiment, unlike the technology disclosed in JP-A-2005-165443, data of a first block is not used. For this reason, data of successive blocks can be read out by one read command, and it is not necessary to issue two read commands in order to read out the first block and the last block, unlike the related art.

In the second embodiment, unlike the technology disclosed in JP-A-2005-165443, comparison is performed only between the verification codes, not for data of all the blocks.

In the second embodiment, data subsequent to the last block is also read out and used for verification. Therefore, data reliability can be improved to an extent out of the related art.

In the second embodiment, since regular information is used as the verification code, in addition to OK or NG determination, such as data comparison, an error factor may be specified by using the regularity of the verification code. Therefore, reliability of the data write operation can be improved.

In the second embodiment, since the amount of data to be compared is small, and thus comparison can be performed by a simple arithmetic operation. As a result, hardware integration can be easily implemented.

What is claimed is:

1. A storage system comprising:
   a plurality of semiconductor memory devices configured to store data; and
   a storage controller coupled to the plurality of semiconductor memory devices via a plurality of paths, and the storage controller is configured to manage one or more logical areas based on the plurality of semiconductor memory devices,
   wherein the storage controller is configured to manage each of the plurality of semiconductor memory devices as a first mode or a second mode,
   wherein in the first mode, a first link is configured to be based on the plurality of paths as a wide link for accessing a single logical area, and in the second mode, one of a plurality of second links which is divided from the wide link is configured to access one of a plurality of partitioned logical areas, and
   wherein the storage controller is configured to manage a first device group based on the plurality of the semiconductor memory devices according to the first mode, and a second device group based on the plurality of the semiconductor memory devices according to the second mode.

2. The storage system according to claim 1, wherein the second link is allocated to one or more independent paths.

3. A storage system comprising:
a plurality of semiconductor memory devices configured to store data;
a storage controller configured to manage one or more logical areas based on the plurality of semiconductor memory devices; and
a plurality of paths to access the one or more logical areas,
wherein the storage controller is configured to manage a first link in which the storage controller is configured to allocate paths of the plurality of paths to access a single logical area based on a semiconductor memory device of the plurality of semiconductor memory devices when the storage controller manages the logical area,
the first link is partitioned into a plurality of second links which are allocated to one or more independent paths, and
one of the plurality of second links is configured to access one of plurality of partitioned logical areas based on the plurality of semiconductor memory devices when the storage controller provides the logical areas.

4. The storage system according to claim 3, wherein the storage controller is configured to manage a first path of the plurality of paths to a first logical area based on a first semiconductor memory device of the plurality of semiconductor memory devices as the first link and second paths of the plurality of paths in second logical areas based on a second semiconductor memory device of the plurality of semiconductor memory devices as the second link.

5. The storage system according to claim 4, wherein the storage controller is configured to manage third paths of the second paths to a third logical area of the second logical areas and fourth paths of the second paths to a fourth logical area of the second logical areas, and to allocate wider bandwidth to the third paths than the fourth paths when the third logical area has a higher access performance than the fourth logical area.

6. The storage system according to claim 5, wherein the number of the third paths is more than the number of the fourth paths when the third logical area has the higher access performance than the fourth logical area.

7. In a storage system having a plurality of semiconductor memory devices configured to store data and a storage controller coupled to the plurality of semiconductor memory devices via a plurality of paths, the storage controller being configured to manage one or more logical areas based on the each of the plurality of semiconductor memory devices, a method comprising the steps of:
managing, by the storage controller, each of the semiconductor memory devices as a first mode or a second mode, wherein in the first mode, a first link is configured to be based on the plurality of paths as a wide link for accessing a single logical area, and in the second mode, one of a plurality of second links which are divided from the wide link is configured to access one of a plurality of partitioned logical areas, and
managing, by the storage controller, a first device group based on the plurality of the semiconductor memory devices according to the first mode, and a second device group based on the plurality of the semiconductor memory devices according to the second mode.

* * * * *